(12) United States Patent
Kim et al.

(10) Patent No.: US 11,277,874 B2
(45) Date of Patent: Mar. 15, 2022

(54) ELECTRONIC DEVICE WHICH RECEIVES DATA BY USING SPLIT BEARER AND OPERATION METHOD OF ELECTRONIC DEVICE

(71) Applicant: Samsung Electronics Co., Ltd., Suwon-si (KR)

(72) Inventors: Hyeonsoo Kim, Suwon-si (KR); Daejun Kang, Suwon-si (KR); Yushin Kim, Suwon-si (KR); Keonyoung Lee, Suwon-si (KR); Yongjae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/985,617

(22) Filed: Aug. 5, 2020

(65) Prior Publication Data
US 2021/0105841 A1    Apr. 8, 2021

(30) Foreign Application Priority Data
Oct. 8, 2019  (KR) .......................... 10-2019-0124404

(51) Int. Cl.
*H04W 24/10* (2009.01)
*H04W 76/14* (2018.01)
(Continued)

(52) U.S. Cl.
CPC ........... *H04W 76/14* (2018.02); *H04L 1/0026* (2013.01); *H04L 47/34* (2013.01); *H04W 24/10* (2013.01)

(58) Field of Classification Search
CPC . H04W 76/14; H04W 24/10; H04W 28/0236; H04W 76/16; H04W 28/06;
(Continued)

(56) References Cited

U.S. PATENT DOCUMENTS 9,572,185 B2   2/2017 Sivanesan et al.
2012/0163161 A1   6/2012 Zhang et al.
(Continued)

FOREIGN PATENT DOCUMENTS

EP   3 158 791 B1   5/2019

OTHER PUBLICATIONS

Oualcomm, Potential issues on slow RLC status reporting, R2-1801266, 3GPP TSG-RAN WG2 Meeting #NR adhoc1 2018, Vancouver, Canada, Jan. 12, 2018, section 2.

(Continued)

*Primary Examiner* — Chuong A Ngo
(74) *Attorney, Agent, or Firm* — Jefferson IP Law, LLP

(57) ABSTRACT

An electronic device and a method thereof are provided. The electronic device includes at least one communication processor which receives data via a first cellular communication or a second cellular communication, and an application processor, wherein the at least one communication processor is configured to receive, from a master node corresponding to the first cellular communication, first partitioned data among partitioned data produced by partitioning the data, and receive second partitioned data from a secondary node corresponding to the second cellular communication, identify a first sequence number of the first partitioned data and a second sequence number of the second partitioned data, and induce a decrease in or a stop of transmission of pieces of partitioned data to the electronic device via a node which transmits partitioned data corresponding to a small sequence number.

20 Claims, 12 Drawing Sheets

(51) Int. Cl.
*H04L 47/34* (2022.01)
*H04L 1/00* (2006.01)

(58) Field of Classification Search
CPC ...... H04W 88/06; H04L 1/0026; H04L 47/34; H04L 2001/0096; H04L 1/0002; H04L 1/0015; H04L 1/0027
See application file for complete search history.

(56) References Cited

U.S. PATENT DOCUMENTS

| | | |
|---|---|---|
| 2015/0373759 A1 | 12/2015 | Wang et al. |
| 2016/0127243 A1* | 5/2016 | Hwang ................ H04L 1/1621 370/235 |
| 2017/0013650 A1 | 1/2017 | Fujishiro et al. |
| 2018/0241687 A1 | 8/2018 | Wigren et al. |
| 2020/0259757 A1* | 8/2020 | Zha ........................ H04L 47/36 |

OTHER PUBLICATIONS

International Search Report dated Nov. 6, 2020, issued in International PCT/KR2020/010346.

* cited by examiner

ELECTRONIC DEVICE WHICH RECEIVES DATA BY USING SPLIT BEARER AND OPERATION METHOD OF ELECTRONIC DEVICE

CROSS-REFERENCE TO RELATED APPLICATION(S)

This application is based on and claims priority under 35 U.S.C. § 119(a) of a Korean patent application number 10-2019-0124404, filed on Oct. 8, 2019, in the Korean Intellectual Property Office, the disclosure of which is incorporated by reference herein in its entirety.

BACKGROUND

1. Field

The disclosure relates to an electronic device and a method of the electronic device. More particularly, the disclosure relates to an electronic device which receives data by using a split bearer and a method of the electronic device.

2. Description of Related Art

As various electronic devices such as smart phones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic demands that have increased after 4th Generation (4G) communication system commercialization, efforts to develop an improved 5th Generation (5G) communication system or a pre-5G communication system have been made. For this reason, the 5G communication system or the pre-5G communication system is called a beyond 4G network communication system or a post long term evolution (LTE) system. In order to achieve a high data transmission rate, an implementation of the 5G communication system in a millimeter (mm)Wave band (for example, 60 gigahertz (GHz) band) is being considered. In the 5G communication system, technologies such as beamforming, massive multiple-input multiple-output (MIMO), Full Dimensional MIMO (FD-MIMO), array antenna, analog beam-forming, and large scale antenna are being discussed as means to mitigate a propagation path loss in the mm Wave band and increase a propagation transmission distance.

The above information is presented as background information only to assist with an understanding of the disclosure. No determination has been made, and no assertion is made, as to whether any of the above might be applicable as prior art with regard to the disclosure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a base station that may be implemented in a dual connectivity (DC) scheme which is a scheme in which after a plurality of pieces of partitioned data are produced by portioning data to be transmitted to a portable terminal, a part of the partitioned data is transmitted through a data transmission path, and another part of the partitioned data is transmitted using another data transmission path. For example, in case of a communication scheme (evolved universal terrestrial radio access new radio-DC (EN-DC)) supporting both $4^{th}$ generation communication and $5^{th}$ generation communication, a base station supporting $4^{th}$ communication may be used as a mater node, and a base station supporting 5th communication may be used as a secondary node. After producing a plurality of pieces of partitioned data by portioning data to be transmitted to a portable terminal, a base station may transmit a part of the partitioned data through a data transmission path corresponding to $4^{th}$ generation communication and transmit another part of the partitioned data by using a data transmission path corresponding to $5^{th}$ generation communication. For example, in case of a communication scheme (EN-DC) supporting both $4^{th}$ generation communication and $5^{th}$ generation communication, a base station supporting communication of a 6 Giga or less band of $5^{th}$ generation may be used as a mater node, and a base station supporting communication of 6 Giga or greater of $5^{th}$ generation may be used as a secondary node.

Due to various environmental causes, a reception speed of data through a particular transmission path and a reception speed of data through another transmission path may be different from each other, and a portable terminal may be on standby until, in a state where a part of pieces of partitioned data is received, another part thereof is received. This may cause a decrease in a data processing speed of the portable terminal.

In addition, in case that a reception speed of data through a particular transmission path and a reception speed of data through another transmission path are significantly different from each other, a portable terminal may delete received partitioned data from pieces of partitioned data and request a base station to retransmit all of the pieces of partitioned data.

Additional aspects will be set forth in part in the description which follows and, in part, will be apparent from the description, or may be learned by practice of the presented embodiments.

In accordance with an aspect of the disclosure, an electronic device is provided. The electronic device includes at least one communication processor which receives data via a first cellular communication or a second cellular communication, and an application processor, wherein the at least one communication processor is configured to receive, from a master node corresponding to the first cellular communication, first partitioned data among partitioned data produced by partitioning the data, and receive second partitioned data from a secondary node corresponding to the second cellular communication, identify a first sequence number of the first partitioned data and a second sequence number of the second partitioned data, and based on comparison of a preconfigured value with a difference value between the first sequence number and the second sequence number, induce a decrease in or a stop of transmission of pieces of partitioned data to the electronic device via a node which transmits partitioned data corresponding to a small sequence number among the first sequence number and the second sequence number.

In accordance with another aspect of the disclosure, an electronic device is provided. The electronic device includes at least one communication processor which receives data via a first cellular communication or a second cellular communication, and an application processor, wherein the at least one communication processor is configured to receive, from a master node corresponding to the first cellular communication, first partitioned data among partitioned data produced by partitioning the data, and receive second partitioned data from a secondary node corresponding to the second cellular communication, identify a first sequence number of the first partitioned data and a second sequence number of the second partitioned data, in response to a case of identifying that the first sequence number and the second sequence number are not consecutive, activate a timer which identifies whether or not a preconfigured time elapses, temporarily store the first partitioned data and the second partitioned data in a queue, in response to a case of identifying that the preconfigured time expires, identify a capacity storable in the queue, and based on a result of identifying the capacity storable in the queue, adjust the preconfigured time.

In accordance with another aspect of the disclosure, a method of an electronic device is provided. The method includes receiving, by a communication processor, from a master node which performs first cellular communication with the electronic device, first partitioned data among partitioned data produced by partitioning data, and receiving second partitioned data from a secondary node which performs second cellular communication with the electronic device, identifying, by a packet data convergence protocol (PDCP) implemented on the communication processor, a first sequence number of the first partitioned data and a second sequence number of the second partitioned data, and based on comparison of a preconfigured value with a difference value between the first sequence number and the second sequence number, inducing, by the PDCP, a decrease in or a stop of transmission of pieces of partitioned data to the electronic device via a node which transmits partitioned data corresponding to a rapid sequence number among the first sequence number and the second sequence number.

An electronic device and a method of the electronic device according to various embodiments may transmit a channel quality indicator (CQI) indicating that the quality of a channel corresponding to a bearer having a relatively low transmission speed is low, in case that a difference in sequence numbers between first partitioned data received via a first cellular communication and a second partitioned data received via second cellular communication is identified to be a preconfigured value or larger. A master node or a secondary node may decrease or stop transmission of data using a bearer having a relatively low transmission speed according to reception of the channel quality indicator. Accordingly, an electronic device and a method of the electronic device may induce a decrease in or a stop of transmission of data using a bearer having a relatively low transmission speed.

An electronic device and a method of the electronic device according to various embodiments may transmit, to a master node or a secondary node, a PDCP state report message indicating that a gap of partitioned data occurs, in case that a difference in sequence numbers between first partitioned data received via a first cellular communication and a second partitioned data received via second cellular communication is identified to be a preconfigured value or larger. Accordingly, a decrease in or a stop of transmission of data using a bearer having a relatively low transmission speed may be induced.

An electronic device and a method of the electronic device according to various embodiments may induce a decrease in or a stop of transmission of data using a bearer having a relatively low transmission speed. Accordingly, reception of data having sequence numbers which are not consecutive can be prevented, and thus a decrease in a data processing speed of an electronic device, caused due to reception of data having sequence numbers which are not consecutive, can be prevented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
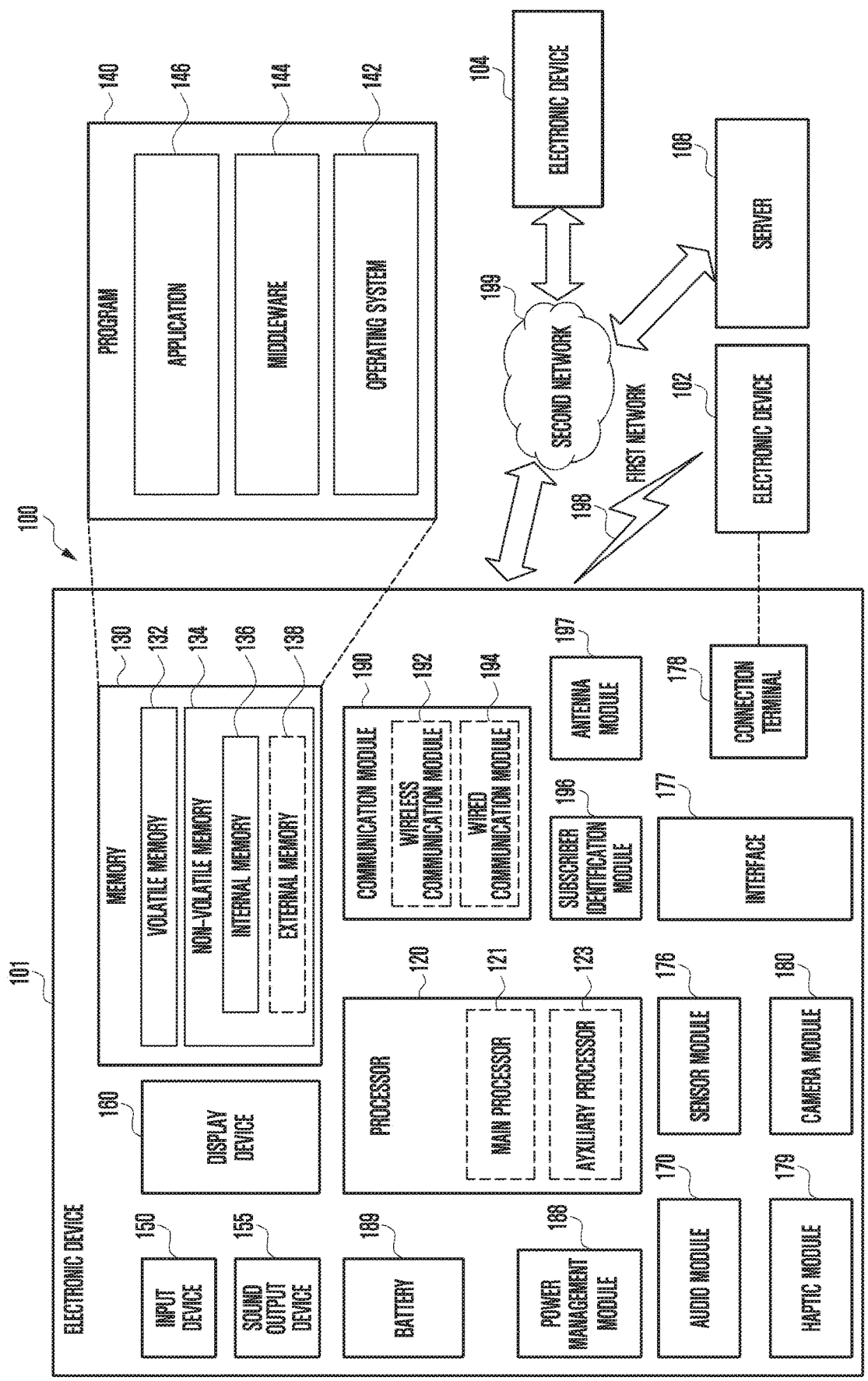
FIG. 1 is a block diagram illustrating an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element implemented using a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102 or 104. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
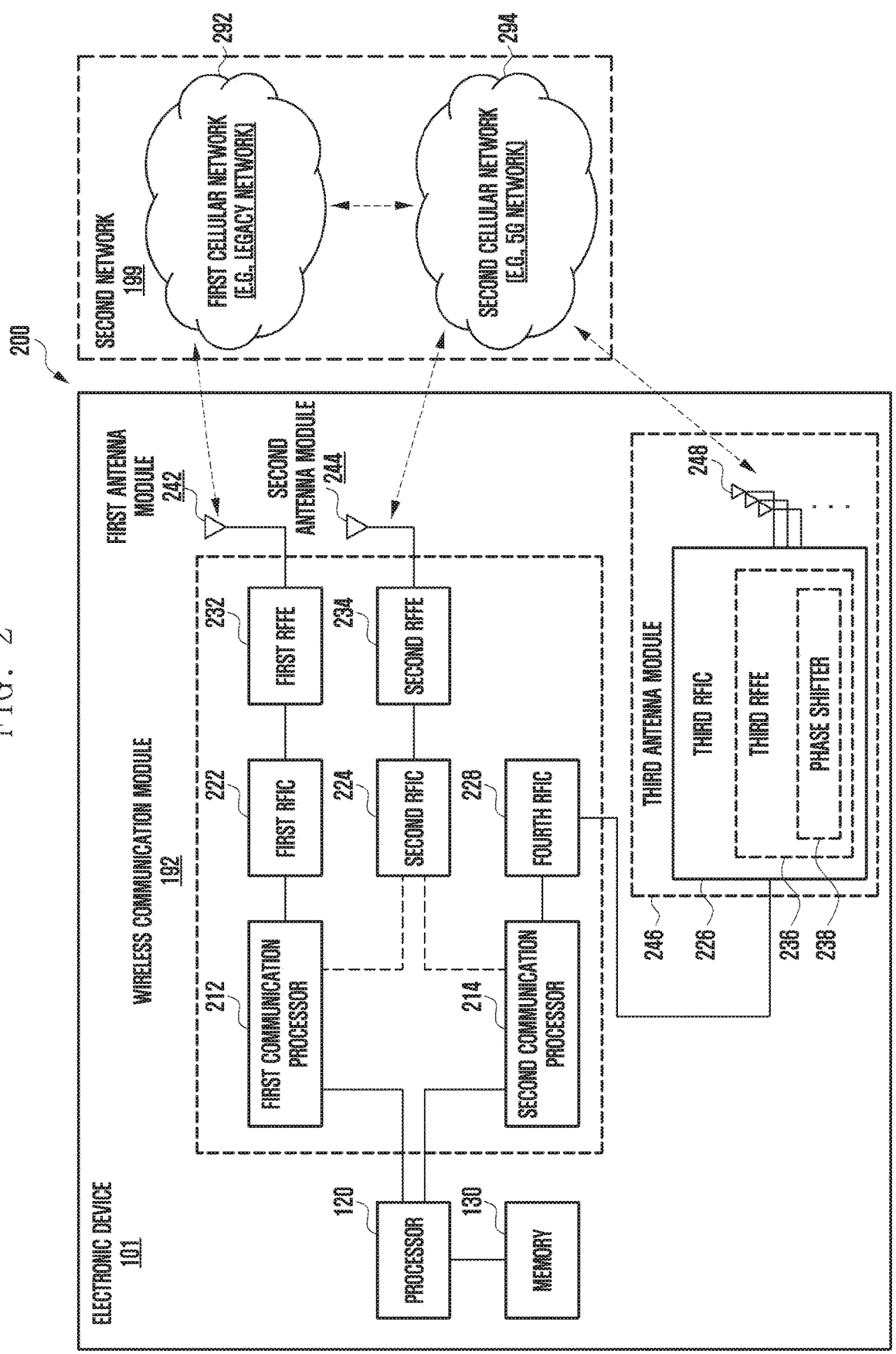
FIG. 2 is a block diagram illustrating an electronic device for supporting legacy network communication and 5G network communication according to an embodiment of the disclosure.

FIG. 2 is a block diagram 200 of an electronic device 101 for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment of the disclosure, the electronic device 101 may further include at least one component among the components illustrated in FIG. 1, and the network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment of the disclosure, the fourth RFIC 228 may be omitted or may be included as a part of the third RFIC 226.

The first communication processor 212 may establish a communication channel of a band to be used for wireless communication with the first network 292, and may support legacy network communication via the established communication channel According to certain embodiments of the disclosure, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel According to certain embodiments of the disclosure, the second network 294 may be a 5G network defined in 3GPP. Additionally, according to an embodiment of the disclosure, the first communication processor 212 or the second communication processor 214 may establish a communication channel corresponding to another designated band (e.g., lower than 6 GHz) among bands to be used for wireless communication with the second network 294, and may support 5G network communication via the established channel According to an embodiment of the disclosure, the first communication processor 212 and the second communication processor 214 may be implemented in a single chip or a single package. According to certain embodiments of the disclosure, the first communication processor 212 or the second communication processor 214 may be implemented in a single chip or a single package, together with the processor 120, the auxiliary processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment of the disclosure, the third RFFE 236 may be implemented as a part of the third RFIC 226.

According to an embodiment of the disclosure, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment of the disclosure, the first RFIC 222 and the second RFIC 224 may be implemented as a single chip or at least a part of the single package. According to an embodiment of the disclosure, the first RFFE 232 and the second RFFE 234 may be implemented as a single chip or at least a part of the single package. According to an embodiment of the disclosure, at least one antenna module of the first antenna module 242 or the second antenna module 244 may be omitted, or may be combined with another antenna module so as to process RF signals in a plurality of bands.

According to an embodiment of the disclosure, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment of the disclosure, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6 RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
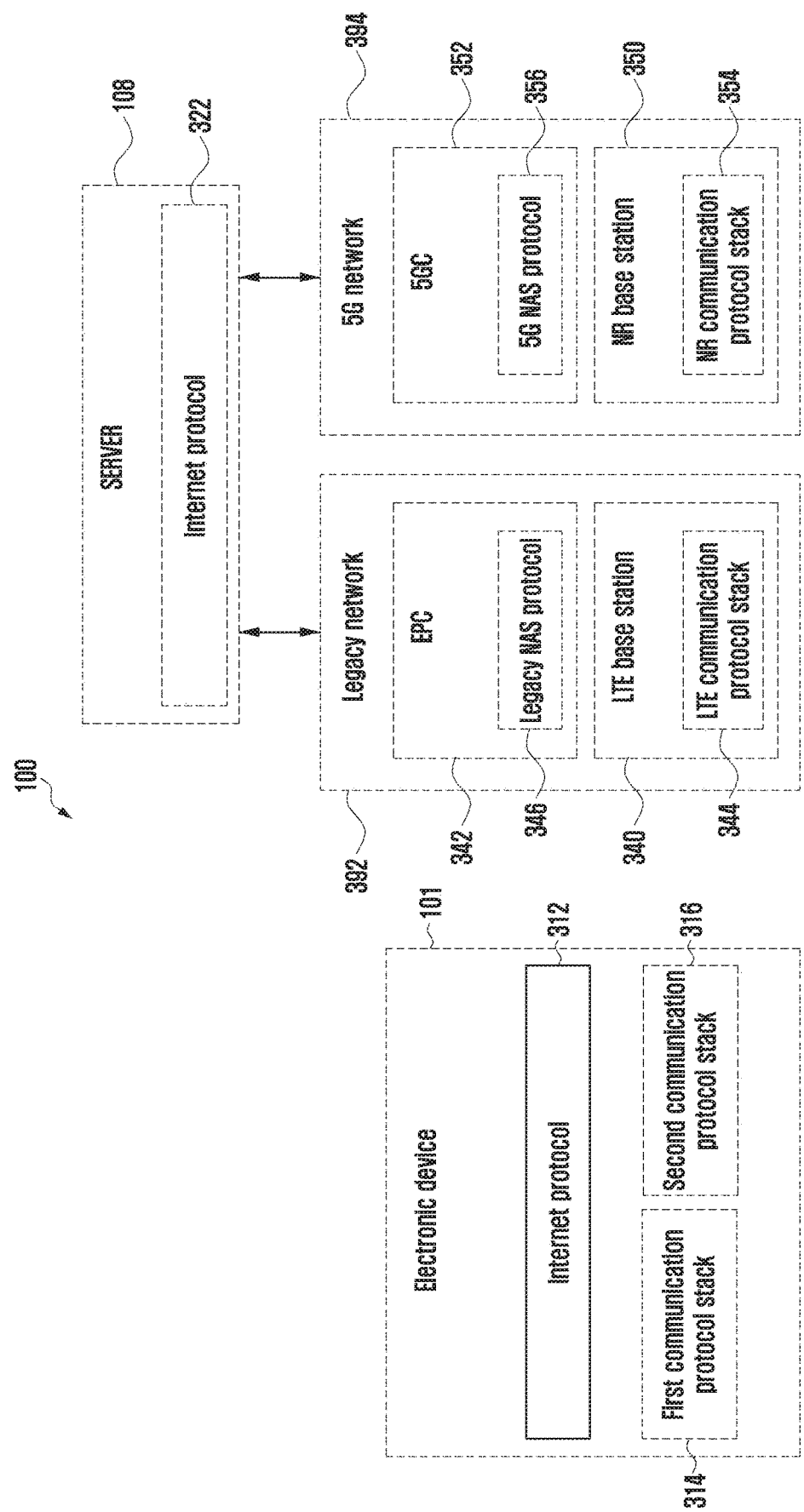
FIG. 3 is a diagram illustrating a protocol stack structure of a legacy communication and/or 5G communication network according to an embodiment of the disclosure.

FIG. 3 illustrates a protocol stack structure of the network 100 of legacy communication and/or 5G communication according to an embodiment of the disclosure.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment of the disclosure, the electronic device 101 may perform Internet communication associated with the server 108 through the Internet protocol 312 (for example, a transmission control protocol (TCP), a user datagram protocol (UDP), or an internet protocol (IP)). The Internet protocol 312 may be executed by, for example, a main processor (for example, the main processor 121 of FIG. 1) included in the electronic device 101.

According to another embodiment of the disclosure, the electronic device 101 may perform wireless communication with the legacy network 392 through the first communication protocol stack 314. According to another embodiment of the disclosure, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment of the disclosure, the server 108 may include a cloud computing server existing outside the legacy network 392 or the 5G network 394. According to another embodiment of the disclosure, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment of the disclosure, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment of the disclosure, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments of the disclosure, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
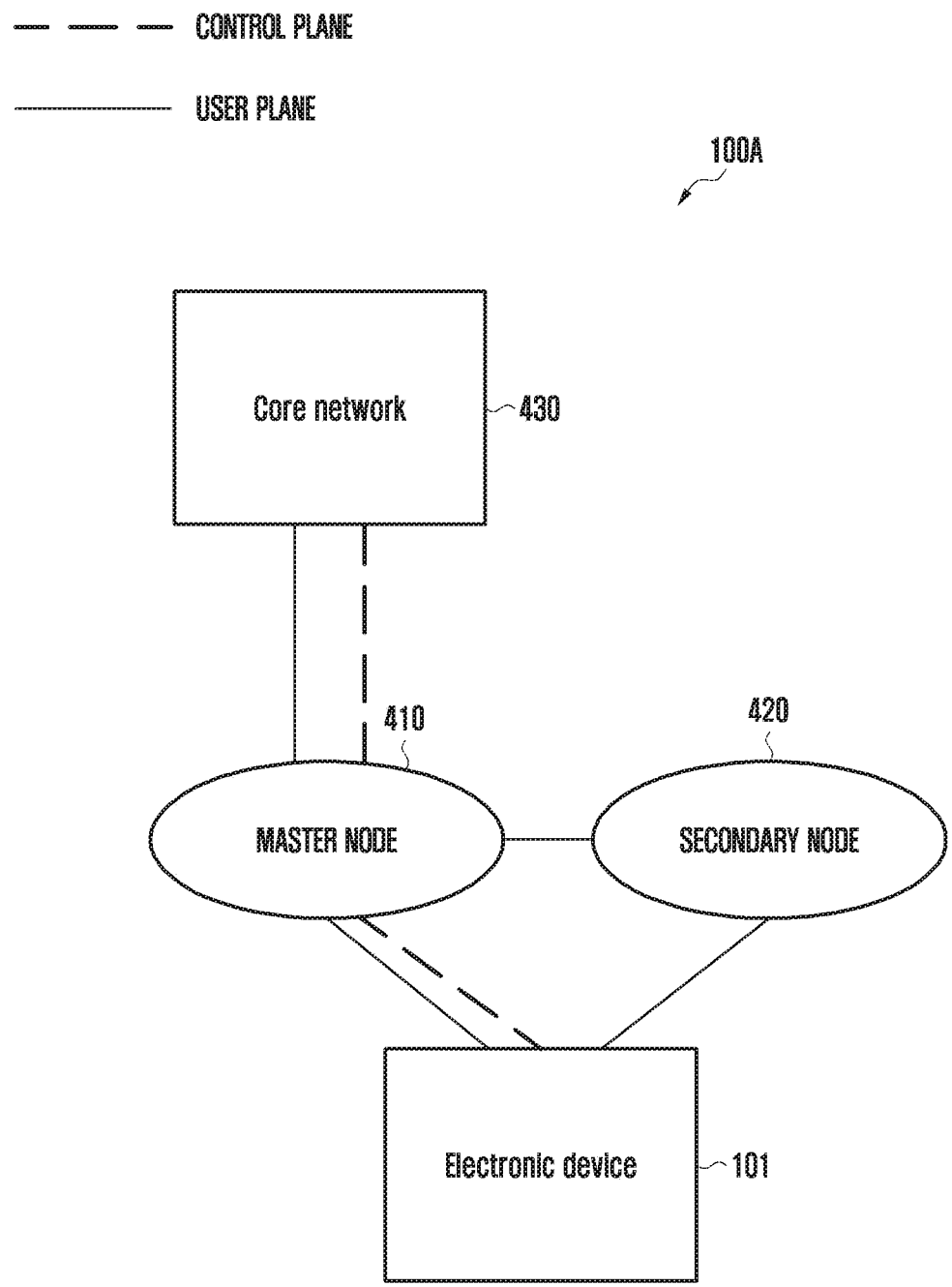
FIG. 4A is a diagram illustrating wireless communication systems for providing a legacy communication and/or a 5G communication network according to an embodiment of the disclosure.
Figure 4B:
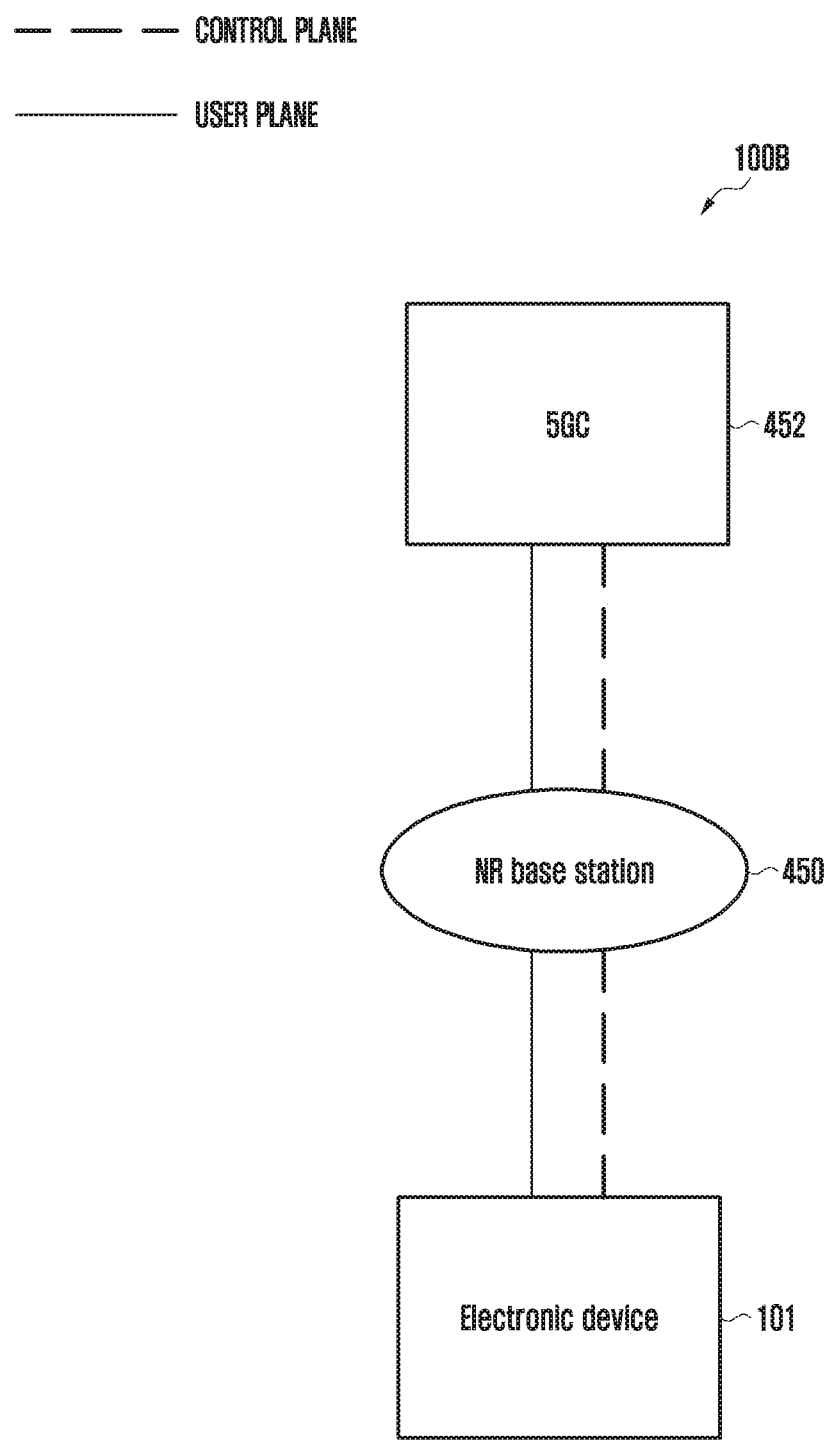
FIG. 4B is a diagram illustrating wireless communication systems for providing a legacy communication and/or a 5G communication network according to an embodiment of the disclosure.
Figure 4C:
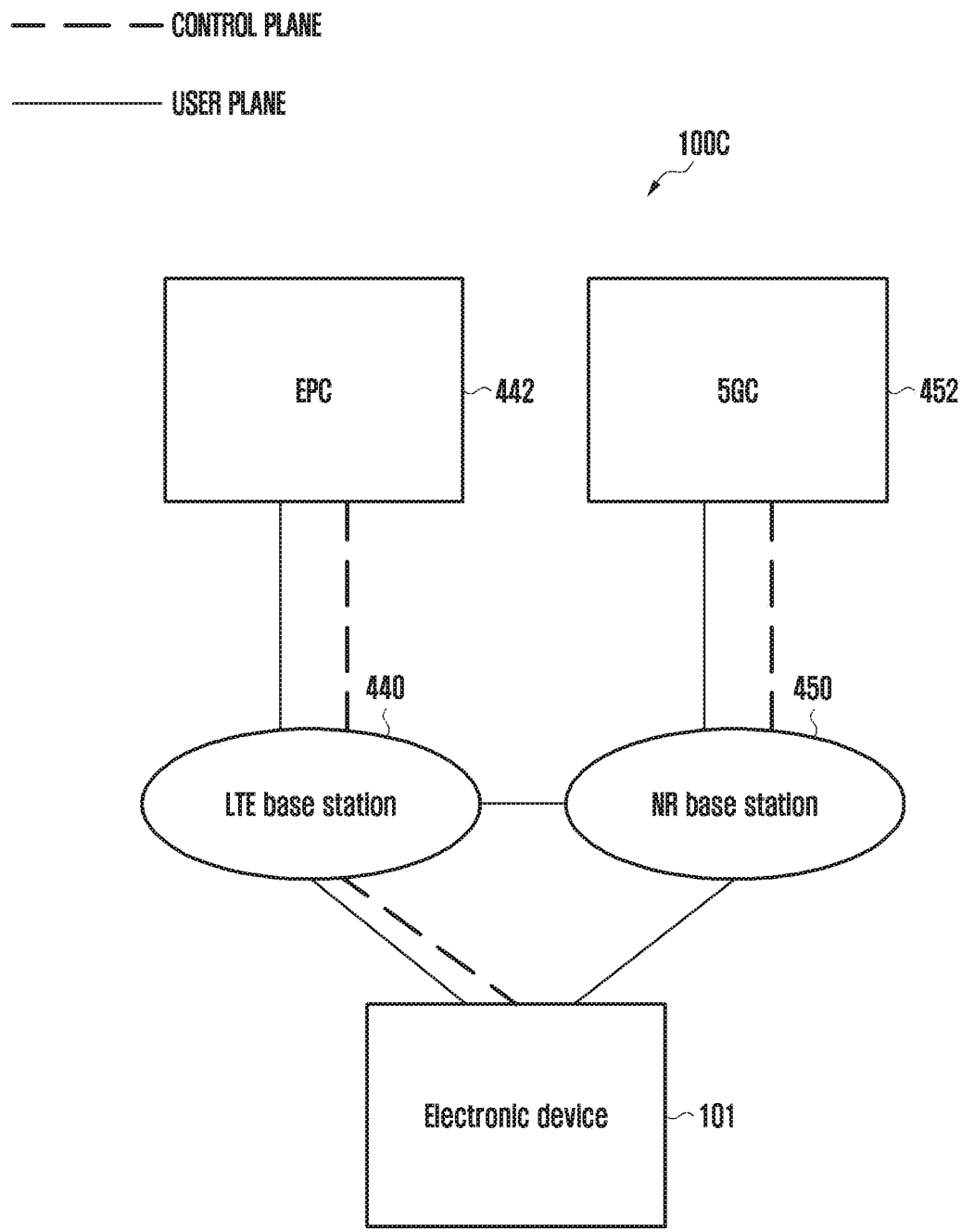
FIG. 4C is a diagram illustrating wireless communication systems for providing a legacy communication and/or a 5G communication network according to an embodiment of the disclosure.

FIG. 4A illustrates a wireless communication system providing a network of legacy communication and/or 5G communication according to an embodiment of the disclosure, FIG. 4B illustrates a wireless communication system providing a network of legacy communication and/or 5G communication according to an embodiment of the disclosure, and FIG. 4C illustrates a wireless communication system providing a network of legacy communication and/or 5G communication according to an embodiment of the disclosure.

Referring to FIGS. 4A to 4C, network environments 100A, 100B and 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a $5^{th}$ generation core (5GC) 452 for managing 5G communication of the electronic device 101.

According to certain embodiments of the disclosure, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments of the disclosure, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments of the disclosure, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments of the disclosure, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments of the disclosure, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment of the disclosure, the electronic device 101 and the 5GC 452 may transmit and receive a control message and user data through the NR gNB 450.

According to certain embodiments of the disclosure, the electronic device 101 may be registered in at least one of the EPC 442 or the 5GC 450 and transmit and receive a control message.

According to certain embodiments of the disclosure, the EPC 442 or the 5GC 452 may interwork and manage communication of the electronic device 101. For example, movement information of the electronic device 101 may be transmitted and received through an interface between the EPC 442 and the 5GC 452.

Figure 5:
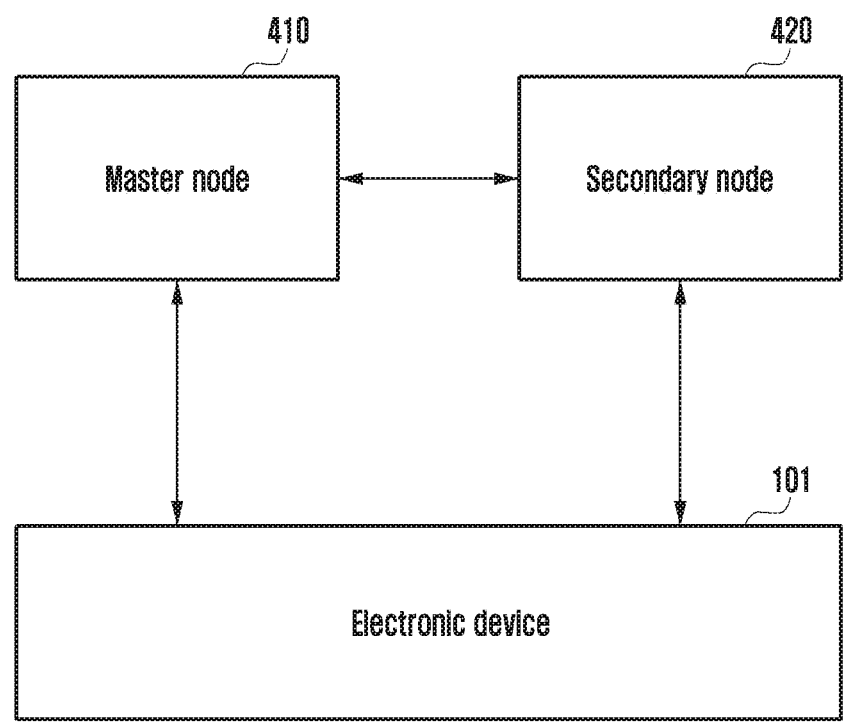
FIG. 5 is a view illustrating data transmission of an electronic device, a first node, and a secondary node according to an embodiment of the disclosure.

FIG. 5 is a view illustrating data transmission of an electronic device, a first node, and a secondary node according to an embodiment of the disclosure.

Referring to FIG. 5, a wireless communication module 192 of an electronic device 101 according to various embodiments may perform first cellular communication with a master node (for example: a master node 410 of FIG. 4A). A first communication processor 520 may transmit or receive a control message and data to or from a master node 410 while performing first cellular communication. First cellular communication may mean one communication scheme among various cellular communication methods supportable by an electronic device 101. For example, first cellular communication, which is one scheme among a $4^{th}$ generation mobile communication scheme (for example: long-term evolution (LTE), LTE-advanced (LTE-A), or LTE advanced pro (LTE-A pro)) or a $5^{th}$ generation mobile communication scheme (for example: 5G on below 6 GHz (sub 6G) or 5G on above 6 GHz (above 6G)), may mean, for example, a communication scheme on a first cellular network of FIG. 2, but is not limited. A master node 410, which is a base station for supporting first cellular communication, may mean a base station which is connected to a core network (for example: a core network 430 of FIG. 4A or an evolved packet core (EPC) 442 of FIG. 4C) to transmit or receive control data.

A wireless communication module 192 of an electronic device 101 according to various embodiments may perform second cellular communication with a secondary node (for example: a secondary node 420 of FIG. 4A). A second communication processor 530 may transmit or receive data to or from a secondary node 420 while performing second cellular communication. Second cellular communication, which is one communication scheme among various cellular communication methods supportable by an electronic device 101, may mean, for example, a communication scheme on a second cellular network 294 of FIG. 2. For example, second cellular communication may be one scheme among a $4^{th}$ generation mobile communication scheme (for example: long-term evolution (LTE), LTE-advanced (LTE-A), or LTE advanced pro (LTE-A pro)) or a $5^{th}$ generation mobile communication scheme (for example: 5G on below 6 GHz or 5G on above 6 GHz), but is not limited. A secondary node 420 may mean a base station for supporting second cellular communication.

According to various embodiments of the disclosure, an E-UTRA-NR dual connectivity (EN-DC) environment, in which first cellular communication is a $4^{th}$ generation mobile communication scheme and second cellular communication is a $5^{th}$ generation mobile communication scheme, is mainly exemplified, but is not limited thereto. For example, various embodiments may also be applied in an NR-E-UTRA dual connectivity (NE-DC) environment in which first cellular communication is a $5^{th}$ generation mobile communication scheme and second cellular communication is a $4^{th}$ generation mobile communication scheme, an NG-RAN E-UTRA-NR dual connectivity (NGEN-DC) environment, and NR-NR dual connectivity (NR-DC) which is an environment in which first cellular communication and second cellular communication schemes are $5^{th}$ generation mobile communication schemes but support frequency bands different from each other.

According to various embodiments of the disclosure, an electronic device 101 may support a split bearer which performs data transmission or reception using a path for receiving data transmitted from a master node 410 and a path for receiving data transmitted from a secondary node 420. A path in which data is received from a master node (for example: the master node 410) among the two paths may be defined as a master cell group bearer (MCG bearer). A path in which data is received from a secondary node (for example: the secondary node 420) among the two paths may be defined as a secondary cell group bearer (SCG bearer).

According to various embodiments of the disclosure, a master node (for example: a master node 410 of FIG. 4A) or a secondary node 420 may transmit data to an electronic device (for example: an electronic device 101 of FIG. 1). A plurality of pieces of partitioned data may be produced by partitioning data to be transmitted by using a packet data convergence protocol (PDCP) implemented in a master node 410 or a secondary node 420. For each of a plurality of pieces of partitioned data (PDCP protocol data units (PDCP PDUs) or packets), a sequence number may be allocated.

According to various embodiments of the disclosure, in case that a PDCP entity of a master node 410 is in charge of data partitioning, a radio link control (RLC) entity of the master node 410 may transmit at least a part of a plurality of pieces of partitioned data to an electronic device 101 through first cellular communication. According to various embodiments of the disclosure, a master node 410 may transmit remaining data among a plurality of pieces of partitioned data to a secondary node 420. An RLC entity of a secondary node 420 may transmit pieces of partitioned data received from a master node 410 to an electronic device 101 through second cellular communication.

According to various embodiments of the disclosure, in case that a PDCP entity of a secondary node 420 is in charge of data portioning, an RLC entity of the secondary node 420 may transmit at least a part of a plurality of pieces of partitioned data to an electronic device 101 through second cellular communication. According to various embodiments of the disclosure, a secondary node 420 may transmit remaining data among a plurality of pieces of partitioned data to a master node 410. An RLC entity of a master node 410 may transmit pieces of partitioned data received from a secondary node 420 to an electronic device 101 through first cellular communication.

According to various embodiments of the disclosure, an electronic device 101 may recombine partitioned data received from a master node 410 and a secondary node 420 and perform various operations by using the recombined data. An electronic device 101 or a PDCP (for example: a PDCP entity 631 of FIG. 6) may identify a sequence number corresponding to each of received pieces of partitioned data and sequentially arrange partitioned data corresponding to the sequence number. An electronic device 101 or a PDCP entity 631 may combine arranged partitioned data. An electronic device 101 may sequentially receive partitioned data according to a sequence number but may also receive partitioned data in a sequence different from the sequence of the sequence number. For example, sequence numbers of pieces of partitioned data received through a secondary cell bearer may be 1 to 3, 5 to 7, and 9 to 12, and sequence numbers of partitioned data received through a master cell bearer may be 4 and 8. For example, an electronic device 101 may receive, through a secondary cell bearer, pieces of partitioned data having sequence numbers that correspond to 1 to 3, 5 to 7, and 9 to 12 and received through the secondary cell bearer, and may receive partitioned data having a sequence number of 4 through a master cell bearer. Likewise, in case that an electronic device 101 does not receive partitioned data having a sequence number of 8 through a master cell bearer, it may be assumed that a part of partitioned data has not been received.

According to comparative embodiments to be compared with various embodiments of the disclosure, in case that partitioned data is received in a sequence different from the sequence of a sequence number (for example: a situation in which partitioned data having sequence numbers corresponding to 9 to 12 is received through a secondary cell bearer and then partitioned data having sequence numbers corresponding to a sequence number corresponding to 8 is received through a master cell bearer), an electronic device 101 may receive the partitioned data having sequence numbers corresponding to 9 to 12 and then may perform a standby operation (time ordering) until the partitioned data having a sequence number corresponding to 8 is received. Standing by until partitioned data which has not been received by an electronic device 101 is received may cause a phenomenon in which a processing speed of data received to the electronic device 101 decreases. Hereinafter, embodiments for preventing a decrease in a data processing speed due to the phenomenon will be described.

Figure 6:
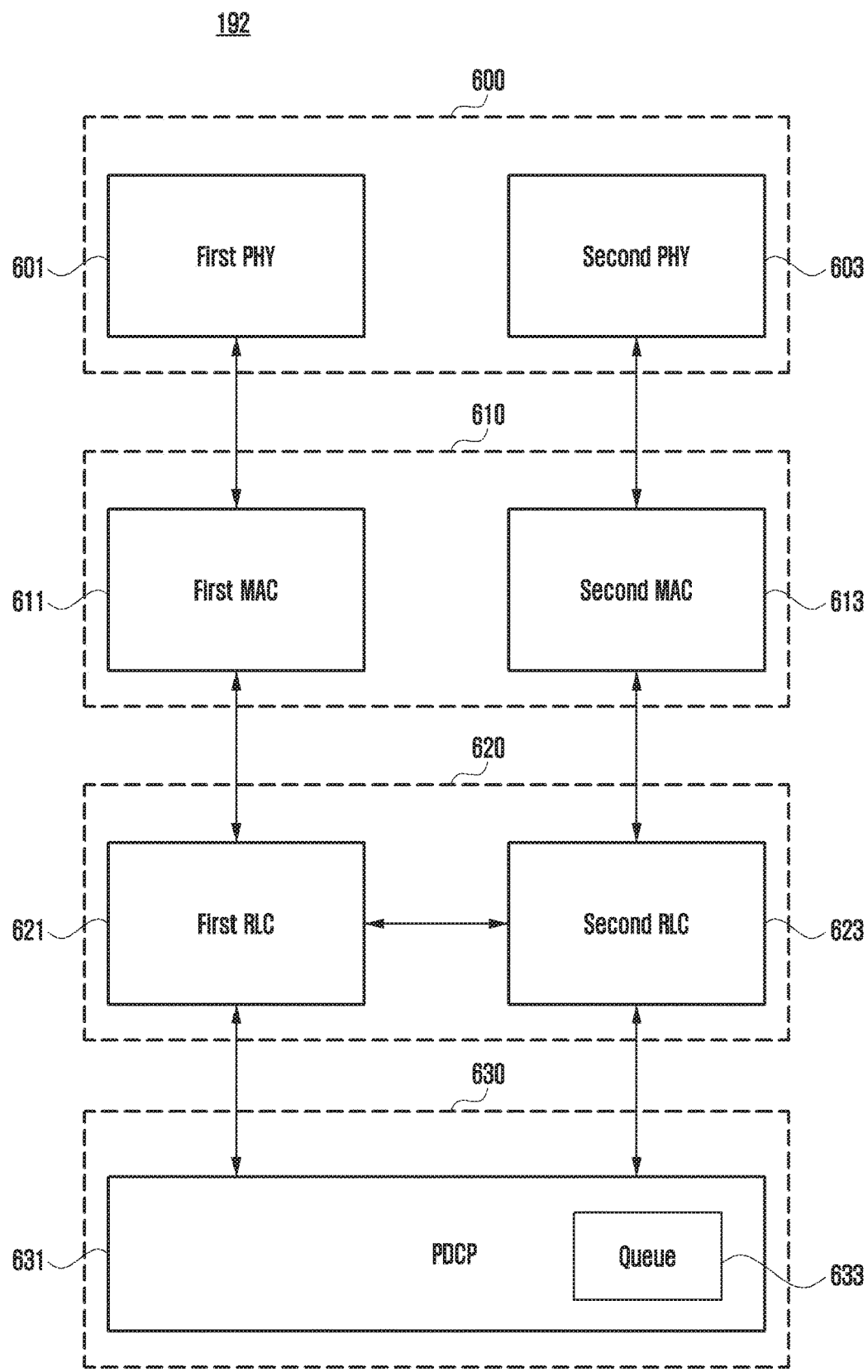
FIG. 6 is a block diagram about a wireless communication module of an electronic device according to an embodiment of the disclosure.

FIG. 6 is a block diagram about a wireless communication module of an electronic device according to an embodiment of the disclosure.

A communication processor (for example: a wireless communication module 192 of FIG. 1) of an electronic device (for example: an electronic device 101 of FIG. 1) according to various embodiments may include a plurality of software layers for data communication. For example, a communication processor (for example: a first communication processor 212 or a second communication processor 214 of FIG. 2) included in a wireless communication module 192 may be provided by performing a plurality of software layers. A plurality of software layers may include one or more entities.

Referring to FIG. 6, on a communication processor 192, a user plane protocol for processing transmitted and received pieces of data and a control plane protocol for processing a control signal for data communication may be implemented. A user plane protocol may include a physical layer 600, a media access control (MAC) layer 610, a radio layer control (RLC) layer 620, and a packet data convergence protocol (PDCP) layer 630.

According to various embodiments of the disclosure, a PHY layer 600 may perform various operations (for example: encoding, hybrid-auto repeat and request, modulation, or allocation) for transmitting, by an MAC layer 610, data to a master node 410 or a secondary node 420, and may transmit data to the master node 410 or the secondary node 420. Otherwise, a PHY layer 600 may receive data transmitted by a master node 410 or a secondary node 420, and may perform various operations (for example: decoding or demodulation) for the received data. A PHY layer 600 may include PHY entities 601 and 603 for performing the operations.

According to various embodiments of the disclosure, in terms of receiving data by a communication processor 192, a first PHY 601 may receive data transmitted by a master node 410, perform data processing (for example: demodulation and decoding), and then transmit processed data to a first MAC 611 of an MAC layer 610. A second PHY 603 may receive data transmitted by a secondary node 420, perform data processing (for example: demodulation and decoding), and then transmit processed data to a second MAC 613 of an MAC layer 610.

According to various embodiments of the disclosure, in terms of transmitting data by a communication processor 192, a first PHY 601 may receive data transmitted by a first MAC 611, perform data processing (for example: encoding and modulation), and then transmit processed data to a master node 410 by using first cellular communication. A second PHY 603 may receive data transmitted by a second MAC 613, perform data processing (for example: encoding and modulation), and then transmit processed data to a secondary node 420 by using second cellular communication.

According to various embodiments of the disclosure, an MAC layer 610 may include MAC entities (for example: first MACs 611 or second MACs 613) which perform an operation of checking an error of data transmitted from an RLC layer 620 or data received from a physical layer (a PHY layer) that transmits or receives data through a wireless channel or various operations of processing data received from the physical layer (a PHY layer), so as to transmit the data to the RLC layer 620. In terms of transmitting data by a communication processor 192, MAC entities 611 and 613 may perform an operation of selecting an appropriate transmission channel to transmit data received from an RLC layer 620 and adding necessary control information to the data received from the RLC layer 620. In terms of receiving data by a communication processor 192 (downlink), MAC entities 611 and 613 may perform processing for transmitting, to an RLC layer 620, data received from a physical layer. MAC entities 611 and 613 may identify whether or not an error occurs in a transmission block received from a physical layer. MAC entities 611 and 613 may request a master node 410 to retransmit data in case that an error in a transmission block is detected.

According to various embodiments of the disclosure, in terms of receiving data (downlink), a first MAC 611 may receive partitioned data transmitted by a master node 410 and transmit the data to a first RLC entity 621. A second MAC 613 may receive partitioned data transmitted by a secondary node 420 and transmit the data to a second RLC entity 623.

According to various embodiments of the disclosure, an RLC layer 620 may include RLC entities (for example: first RLC entities 621 or second RLC entities 623) which perform various operations for data transmitted from a PDCP layer 630 or data transmitted from an MAC layer 610.

In terms of transmitting data by a communication processor 192 (uplink), RLC entities 621 and 623 may identify sequence numbers of a plurality of pieces of data included in pieces of data (RLC SDUs) transmitted from a PDCP layer 630, and combine, partition, or reassemble the data in a size receivable from an MAC layer 610. RLC entities 621 and 623 may transmit, to an MAC layer 610, data obtained by adding an RLC header to combined, partitioned, or reassembled data. In terms of receiving data by a communication processor 192 (downlink), RLC entities 621 and 623 may identify sequence numbers of data transmitted from an MAC layer 610, and perform processing (for example: combining, partitioning, or reassembling data) for transmitting data to a PDCP layer 630.

According to various embodiments of the disclosure, in terms of receiving data (downlink), a first RLC entity 621 may receive partitioned data transmitted by a first MAC entity 611 and transmit partitioned data received by a PDCP entity 631. A second RLC entity 623 may receive partitioned data transmitted by a second MAC entity 613 and transmit partitioned data received by a PDCP entity 631.

According to various embodiments of the disclosure, a PDCP layer 630 may include a PDCP entity 631 which performs an operation of receiving data transmitted by an RLC layer 620 and combining the received data. In terms of transmitting the data by a communication processor 192 (uplink), a PDCP entity 631 may produce data units in a scheme of partitioning data to be transmitted into a preconfigured size. A PDCP entity 631 may grant a sequence number for each of data units. A PDCP entity 631 may transmit produced data units to each of RLC entities 621 and 623 of an RLC layer 620. In terms of receiving data by a communication processor 192 (downlink), a PDCP entity 631 may identify a sequence number of each of received pieces of data and may combine the received data, based on the sequence number. A PDCP entity 631 may perform various processing operations for received data (for example: integrity verification of the received data), and may transmit processed data to other layers (various layers (for example: an IP layer or an application layer) which are higher layers than a PDCP layer 630).

According to various embodiments of the disclosure, in terms of receiving data (downlink), a PDCP entity 631 may receive partitioned data transmitted by a first RLC entity 621 or a second RLC entity 623 and identify a sequence number. A PDCP entity 631 may identify a first sequence number of first partitioned data transmitted by a first RLC entity 621 and a second sequence number of second partitioned data transmitted by a second RLC entity 623. Referring to 3GPP 38.323, a PDCP entity 631 may identify a first sequence number by referring to an RCVD_COUNT_RLC1 (for example: RCVD_COUNT_LTE of EN-DC) item included in data transmitted by a first RLC entity 621. A PDCP entity 631 may identify a second sequence number by referring to an RCVD_COUNT_RLC2 (for example: RCVD_COUNT_NR of EN-DC) item included in data transmitted by a second RLC entity 623.

According to various embodiments of the disclosure, a PDCP entity 631 may identify whether or not a difference between a first sequence number of data having the largest sequence number among pieces of data transmitted by a first RLC entity 621 to the PDCP entity 631 and a second sequence number of data having the largest sequence number among pieces of data transmitted by a second RLC entity 623 to the PDCP entity 631 is equal to or greater than (or exceeds) a preconfigured value.

According to another embodiment of the disclosure, a PDCP entity 631 may identify whether or not a difference between a first sequence number of the most recently received data among pieces of data transmitted by a first RLC entity 621 to the PDCP entity 631 and a second sequence number of the most recently received data among pieces of data transmitted by a second RLC entity 623 to the PDCP entity 631 is equal to or greater than (or exceeds) a preconfigured value.

According to various embodiments of the disclosure, in case that a difference between a first sequence number and a second sequence number is equal to or greater than a preconfigured value, it may be defined that a gap for reception of partitioned data has occurred. In case of a comparative embodiment of the disclosure, in response to a case of identifying that a gap for reception of partitioned data has occurred, a PDCP entity 631 may suspend processing of partitioned data until partitioned data having a sequence number between first partitioned data and second partitioned data is received. A stop of processing of partitioned data may cause a decrease in a data processing speed. In case that a PDCP entity 631 has not received partitioned data having a sequence number between first partitioned data and second partitioned data for a preconfigured time, retransmission of a plurality of pieces of partitioned data including first partitioned data and second partitioned data should be requested, and thus a data processing speed may decrease. Hereinafter, various embodiments of operations for preventing a decrease in a data processing speed in case of occurrence of a gap for reception of partitioned data will be described.

According to various embodiments of the disclosure, a PDCP entity 631 may perform an operation of, in response to a case of identifying that a difference between a first sequence number and a second sequence number is equal to or greater than (or exceeds) a preconfigured value, inducing a decrease in or a stop of data transmission using a bearer having a relatively low data transmission speed. The preconfigured value may be stored in a memory (for example: a memory 130 of FIG. 1) of an electronic device 101, and may be changed by a manufacturer of the electronic device 101 or a business operator of first cellular communication and second cellular communication.

According to various embodiments of the disclosure, a PDCP entity 631 may compare a transmission speed of a bearer corresponding to each of pieces of partitioned data. According to various embodiments of the disclosure, a PDCP entity 631 may determine, as a bearer having a relatively low data transmission speed, a bearer which has received a relatively small number of pieces of partitioned data. For example, in a situation in which there are ten pieces of partitioned data received through a master cell bearer and 100 pieces of partitioned data received through a secondary cell bearer, a PDCP entity 631 may determine the master cell bearer as a bearer having a relatively low data transmission speed.

According to another embodiment of the disclosure, a PDCP entity 631 may determine, as a bearer having a relatively low data transmission speed, a bearer in which the size of received partitioned data is relatively small. For example, in case that the sum of the sizes of pieces of partitioned data received through a master cell bearer is lower than the sum of the sizes of pieces of partitioned data received through a secondary cell bearer, a PDCP entity 631 may determine the master cell bearer as a bearer having a relatively low data transmission speed.

According to various embodiments of the disclosure, a PDCP entity 631 may determine a bearer corresponding to reception of partitioned data having a relatively low sequence number as a bearer having a relatively low data transmission speed. Considering a feature in which partitioned data having a relatively small sequence number should arrive faster than partitioned data having a large sequence number, a bearer which receives partitioned data having a relatively small sequence number may be a bearer having a relatively lower transmission speed than a bearer which receives partitioned data having a large sequence number.

According to various embodiments of the disclosure, in response to a case of identifying that a difference between a first sequence number and a second sequence number is equal to or greater than (exceeds) a preconfigured value, a PDCP entity 631 may transmit, to a first PHY 601 or a second PHY 603, an indicator indicating that a gap for reception of partitioned data occurs. A PDCP entity 631 may transmit an indicator indicating that a gap for reception of partitioned data occurs in a PHY corresponding to a bearer having a relatively low transmission speed. For example, in case that a transmission speed of first cellular communication is relatively lower than that of second cellular communication, a PDCP entity 631 may transmit, to a first PHY 601 corresponding to the first cellular communication, an indicator indicating that a gap for reception of partitioned data occurs. As another example, in case that a transmission speed of second cellular communication is relatively lower than that of first cellular communication, a PDCP entity 631 may transmit, to a second PHY 603 corresponding to the second cellular communication, an indicator indicating that a gap for reception of partitioned data occurs.

According to various embodiments of the disclosure, a PHY entity which receives an indicator indicating that a gap for reception of partitioned data is produced from a PDCP entity 631 among a first PHY 601 or a second PHY 603 may transmit, to at least one among a master node 410 or a secondary node 420, a channel quality indicator (CQI) indicating that the quality of a channel corresponding to a bearer having a relatively low data transmission speed is low. For example, a node corresponding to a channel having a relatively slow data transmission speed among a master node 410 or a secondary node 420 may receive a CQI. According to various embodiments of the disclosure, a channel quality indicator may mean information transmitted from a physical uplink control channel (PUCCH) transmitted or received on a physical plane protocol. According to various embodiments of the disclosure, a channel quality indicator may mean a control signal transmitted from a physical uplink shared channel (PUSCH) transmitted or received on a physical plane protocol. According to various embodiments of the disclosure, a channel quality indicator may be one of information included in uplink control information (UCI) which an electronic device 101 transmits to a master node 410 or a secondary node 420. In response to a case of receiving information indicating that a difference between a first sequence number and a second sequence number transmitted by a PDCP entity 631 is equal to or greater than (or exceeds) a preconfigured value, regardless of whether or not an operation of measuring the quality of a channel corresponding to a bearer having a relatively low data transmission speed is performed, a first PHY 601 or a second PHY 603 included in a PHY layer 600 may transmit, to at least one among a master node 410 or a secondary node 420, a channel quality indicator (CQI) indicating that the quality of a channel is low. A channel quality indicator indicating that the quality of a channel is low may be transmitted by PHY entities 601 and 603 corresponding to cellular communication having a relatively low data transmission speed. For example, a first PHY 601 corresponding to first cellular communication having a relatively low data transmission speed may transmit a channel quality indicator to a master node 410. As another example, a second PHY 603 corresponding to second cellular communication having a relatively low data transmission speed may transmit a channel quality indicator to a secondary node 420.

According to various embodiments of the disclosure, a master node 410 or a secondary node 420 which has received a CQI indicating that the quality of a channel is low may transmit information related to the CQI to the secondary node 420 or the master node 410 where a PDCP for performing a data partitioning operation is located. According to various embodiments of the disclosure, a channel quality indicator may be transmitted to a core network 430 via an NAS protocol.

According to various embodiments of the disclosure, a master node 410 or a secondary node 420 which has received a CQI indicating that the quality of a channel is low may decrease the amount of data transmitted through a bearer having a relatively low data transmission speed. The amount of data may mean the number of pieces of partitioned data or the size of partitioned data. By transmitting a channel quality indicator indicating that the quality of a channel corresponding to a bearer having a relatively low data transmission speed is low, an electronic device 101 may induce a decrease in data transmission using a bearer having a relatively low data transmission speed.

According to various embodiments of the disclosure, in response to a case of identifying that a difference between a first sequence number and a second sequence number is equal to or greater than (or exceeds) a preconfigured value, a PDCP entity 631 may transmit, to a master node 410 or a secondary node 420, a channel quality indicator (CQI) indicating that it is impossible to receive data by using a bearer having a relatively low data transmission speed. A channel quality indicator may be transmitted to a node having a relatively low data transmission speed among a master node 410 or a secondary node 420.

According to various embodiments of the disclosure, in response to a case of identifying that a difference between a first sequence number and a second sequence number is equal to or greater than (or exceeds) a preconfigured value, regardless of whether or not an operation of measuring the quality of a channel corresponding to a bearer having a relatively low data transmission speed is performed, a PDCP entity 631 may transmit, to a master node 410 or a secondary node 420, a channel quality indicator (CQI) indicating that it is impossible to receive data by using a bearer having a relatively low data transmission speed. A channel quality indicator may be transmitted to a node having a relatively low data transmission speed among a master node 410 or a secondary node 420. Referring to Table 1 (data transmission or reception using 64 quadrature amplitude modulation (QAM)), Table 2 (data transmission or reception using 256 QAM), and Table 3 (data transmission or reception using 64 QAM) below, which are present in 38.214 of 3GPP, a PHY entity (not shown) may notify, to a node having a relatively low data transmission speed among a master node 410 or a secondary node 420, that data reception is impossible by configuring a channel quality indicator to 0.

TABLE 1

| CQI index | modulation | code rate × 1024 | efficiency |
|---|---|---|---|
| 0 | out of range (data reception is impossible) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | modulation | code rate × 1024 | efficiency |
|---|---|---|---|
| 0 | out of range (data reception is impossible) | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 3

| CQI index | modulation | code rate × 1024 | efficiency |
|---|---|---|---|
| 0 | out of range (data reception is impossible) | | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

According to various embodiments of the disclosure, a master node 410 or a secondary node 420 which has received a channel quality indicator indicating that the quality of a channel is low may decrease the number of pieces of data transmitted through a bearer having a relatively low data transmission speed or may stop data transmission. An electronic device 101 may induce a decrease in or a stop of data transmission using a bearer having a relatively low data transmission speed via a scheme as described above.

According to various embodiments of the disclosure, in response to a case of identifying that a difference between a first sequence number and a second sequence number is equal to or greater than (or exceeds) a preconfigured value, a PDCP entity 631 may produce a PDCP state (status) report message which provides, to a master node 410, indication that a gap in reception of partitioned data has occurred (or that the difference between the first sequence number and the second sequence number is equal to or greater than (or exceeds) the preconfigured value). An electronic device 101 may transmit a PDCP state report message produced by a PDCP entity 631 to a node having a relatively low data transmission speed among a master node 410 or a secondary node 420 by using an access stratum (AS) protocol.

According to various embodiments of the disclosure, a PDCP state report message may use a PDCP control PDU format defined in 3GPP 38.323. Tables 4 and 5 below show examples of a format of a PDCP state report message.

TABLE 4

| D/C | PDU TYPE | R | R | G | RAT |
|---|---|---|---|---|---|

According to various embodiments of the disclosure, referring to Table 4, a PDCP state report message may include an indicator (D/C) indicating whether or not a PDU state report message is a control message or user data, a type (PDU TYPE) of a message indicating a gap occurrence detection state report message, empty data (R), an indicator (G) indicating whether or not a gap occurs, and an indicator (RAT) indicating cellular communication which transmits a low sequence number. For example, in response to a case of detecting occurrence of a gap, a PDCP entity 611 may produce a PDCP state report message including an indicator (G) including a value (1) indicating occurrence of a gap and an indicator RAT including a value (for example: 1 for first cellular communication and 0 for second cellular communication) indicating particular cellular communication, and may transmit the produced state report message to a master node 410 or a secondary node 420.

TABLE 5

| D/C | PDU TYPE | R | R | G | N |
|---|---|---|---|---|---|

According to various embodiments of the disclosure, referring to Table 5, a PDCP state report message may include a type (PDU TYPE) of a message indicating a gap occurrence detection state report message, an indicator (G) indicating whether or not a gap occurs, and a node (N) indicating cellular communication which transmits a low sequence number. For example, in response to a case of detecting occurrence of a gap, a PDCP entity 611 may produce a PDCP state report message including an indicator (G) including a value (1) indicating occurrence of a gap and an indicator (N) including a value (for example: 0 for a master node and 1 for a secondary node) indicating particular cellular communication, and may transmit the produced state report message to a master node 410 or a secondary node 420. According to various embodiments of the disclosure, in case that there are two or more secondary nodes, the number of bits corresponding to an indicator (N) may increase according to the number of the secondary nodes.

According to various embodiments of the disclosure, a master node 410 or a secondary node 420 which has received a PDCP state report message indicating that a gap in reception of partitioned data has occurred may decrease the number of pieces of data transmitted through a bearer having a relatively low data transmission speed. Via a scheme as described above, an electronic device 101 may induce a decrease in or a stop of data transmission using a bearer having a relatively low data transmission speed.

According to various embodiments of the disclosure, a PDCP entity 631 may activate a first timer while performing an operation of inducing, by a node which transmits partitioned data corresponding to a small sequence number among a first sequence number and a second sequence number, a decrease or a stop of transmission of pieces of partitioned data to an electronic device. In response to a case of identifying that a first timer expires, a PDCP entity 631 may identify whether or not a difference value between a first sequence number and a second sequence number is equal to or greater than (or exceeds) a preconfigured value. In response to a case of identifying that a difference value between a first sequence number and a second sequence number is equal to or greater than (or exceeds) a preconfigured value, a PDCP entity 631 may maintain an operation of inducing, by a node which transmits partitioned data corresponding to a small sequence number among a first sequence number and a second sequence number, a decrease or a stop of transmission of pieces of partitioned data to an electronic device. An expiration time of a first timer may increase according to the number of times it is identified that a difference value between a first sequence number and a second sequence number is equal to or greater than (or exceeds) a preconfigured value. For example, an expiration time of a first timer may increase by 60 seconds, 120 seconds, and 180 seconds according to the number of identification times.

According to various embodiments of the disclosure, in response to a case of identifying that a sequence number does not receive consecutive partitioned data (or identifying that a difference value between a first sequence number and a second sequence number is 2 or larger), a PDCP entity 631 may activate a second timer. In a state where first partitioned data and second partitioned data are stored in a queue 633, a PDCP entity 631 may identify whether or not a sequence number has received consecutive partitioned data before a second timer expires.

According to various embodiments of the disclosure, a PDCP entity 631 may identify a capacity storable in a queue 633 after a second timer is activated. A capacity storable in a queue 633 may mean a capacity excluding a capacity occupied by partitioned data including first partitioned data and second partitioned data from the total capacity of the queue 633. Based on the level of a capacity storable in a queue 633, a PDCP entity 631 may adjust a remaining time before expiration of a second timer. For example, in response to a case of identifying that, for example, half a time configured in a second timer elapses, a PDCP entity 631 may identify a capacity storable in a queue 633.

According to various embodiments of the disclosure, in response to a case of identifying that the level of a capacity storable in a queue 633 is less than a preconfigured value, a PDCP entity 631 may decrease a remaining time. According to an embodiment of the disclosure, a preconfigured value may be a value related to at least one among a transmission speed of first cellular communication or a transmission speed of second cellular communication. For example, in case that a transmission speed of first cellular communication or second cellular communication is 250 kbps, a method of determining a preconfigured value as 250 kbit or an integer multiple (500 kbit, 750 kbit) of this value is possible. A case in which the level of a capacity storable in a queue 633 is less than a preconfigured value may mean a state in which the number of pieces of partitioned data transmitted to a PDCP entity 631 is relatively large. According to an embodiment of the disclosure, in the state, quality related to a transmission speed of first cellular communication or second cellular communication may be good. In the state, a partitioned data reception speed may be higher in a scheme in which a PDCP entity 631 receives data by re-partitioning at a master node 410 or a secondary node 420 than in a scheme in which reception of partitioned data is on standby according to a comparative embodiment while a timer is active.

According to various embodiments of the disclosure, based on a capacity storable in a queue 633, a PDCP entity 631 may determine the degree of decrease of a preconfigured time. The less a capacity storable in a queue 633 is, the more a PDCP entity 631 may increase the degree of decrease of a remaining time. Table 6 shows a changed value of a remaining time according to a ratio between a total capacity of a queue and a capacity storable in the queue.

TABLE 6

| Capacity storable in a queue 633/ Total capacity of the queue 633 | Changed value of remaining time |
| --- | --- |
| 50% | Remaining time |
| 40% | Remaining time *0.8 |
| 30% | Remaining time *0.6 |
| 20% | Remaining time *0.4 |
| 10% | Remaining time *0.2 |
| 0% | 0 |

According to various embodiments of the disclosure, the more a capacity storable in a queue 633 decreases, the more a PDCP entity 631 may increase the degree of decrease of a preconfigured time, and thus a timer may be allowed to expire rapidly. According to various embodiments of the disclosure, a method of increasing a second timer increment not by a unit time (for example: +1 second) but by a multiple (for example: +2 seconds) of the unit time is possible. In response to expiration of a timer, a PDCP entity 631 may request, to a master node 410 or a secondary node 420, retransmission of partitioned data. According to various embodiments of the disclosure, a method of requesting retransmission to a master node 410 or a secondary node 420 may include an operation of terminating rearrangement of packets not received in the middle before expiration of a second timer, transmitting data received so far to an upper end, and requesting, based on data not received at the upper end, retransmission to a network. Via a scheme as described above, a PDCP entity 631 may prevent reception of data having sequence numbers which are not consecutive.

In case of a comparative embodiment in which a preconfigured time does not decrease, a PDCP entity 631 may be on standby to receive partitioned data until a timer expires. In case that quality related to a transmission speed of first cellular communication or second cellular communication is relatively good, a data processing speed of a PDCP entity 631 may be faster in a situation in which partitioned data is re-received than in a situation in which reception of partitioned data is on standby.

According to various embodiments of the disclosure, a PDCP entity 631 may change, based on a data processing speed of a PDCP entity 631, a capacity of a queue 633. A data processing speed of a PDCP entity 631 may mean a processing speed of data obtained by combining partitioned data received by a PDCP entity 631 and transmitted to an application processor (for example: a processor 120 of FIG. 1). A case in which a data processing speed of a PDCP entity 631 is relatively large may mean a state in which the number of pieces of partitioned data transmitted to a PDCP entity 631 is relatively large. In the state, quality related to a transmission speed of first cellular communication or second cellular communication may be good. In the state, a partitioned data reception speed may increase in a scheme in which a PDCP entity 631 re-receives partitioned data from a master node 410 or a secondary node 420 than in a scheme in which a PDCP entity 631 is on standby to receive partitioned data from a master node 410 or a secondary node 420 while a preconfigured time elapses. A PDCP entity 631 may induce a PDCP entity 631 to re-receive partitioned data from a master node 410 or a secondary node 420 by decreasing a capacity of a queue 633. A PDCP entity 631 may adjust a capacity storable in a queue 633, based on a data processing speed of the PDCP entity 631. The more a data processing speed of a PDCP entity 631 increases, the more the PDCP entity 631 may decrease a capacity storable in a queue 633.

According to various embodiments of the disclosure, the more a data processing speed of a PDCP entity 631 increases, the more the PDCP entity 631 may decrease a capacity storable in a queue 633. In case that there is not capacity storable in a queue 633, a PDCP entity 631 may request, to a master node 410 or a secondary node 420, retransmission of partitioned data. Via a scheme as described above, a PDCP entity 631 may prevent reception of data having sequence numbers which are not consecutive, and the PDCP entity 631 may prevent a data processing speed from decreasing due to reception of data having sequence numbers which are not consecutive.

Figure 7:
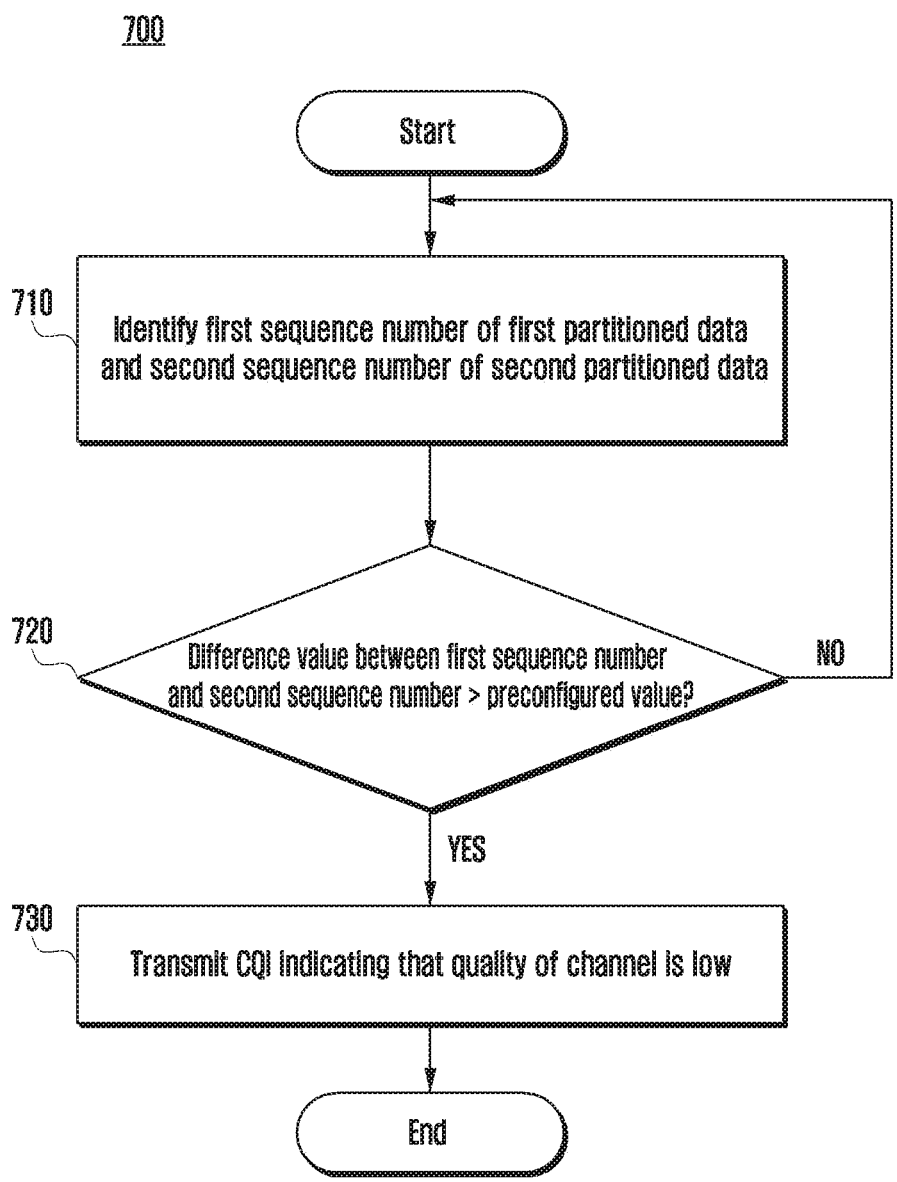
FIG. 7 is a view illustrating an electronic device where a channel quality indicator indicating that the quality of a channel is low is transmitted according to an embodiment of the disclosure.

FIG. 7 is a view illustrating an embodiment in which, in an electronic device, a CQI indicating that the quality of a channel is low is transmitted according to an embodiment of the disclosure.

A communication processor (for example: a communication processor 192 of FIG. 6) of an electronic device (for example: an electronic device 101 of FIG. 1) according to various embodiments may receive first partitioned data from a master node (for example: a master node 410 of FIG. 4A), and may receive second partitioned data from a secondary node (for example: a secondary node 420 of FIG. 4A). First partitioned data and second partitioned data may be included in a plurality of pieces of partitioned data produced by partitioning one piece of data by a master node 410 or a secondary node 420.

Referring to FIG. 7, according to various embodiments of the disclosure, in operation 710 of flowchart 700, a communication processor 192 may identify a first sequence number of first partitioned data and a second sequence number of second partitioned data.

According to various embodiments of the disclosure, in operation 720, a communication processor 192 may identify whether or not a difference value between a first sequence number and a second sequence number is equal to or greater than (or exceeds) a preconfigured value.

According to various embodiments of the disclosure, in case that a difference between a first sequence number and a second sequence number is equal to or greater than a preconfigured value, it may be defined that a gap for reception of partitioned data has occurred. In case that a gap for reception of partitioned data occurs, a PDCP entity 631 may suspend processing of partitioned data until partitioned data having a sequence number between first partitioned data and second partitioned data is received. A stop of processing of partitioned data may cause a decrease in a data processing speed.

According to various embodiments of the disclosure, in response to a case of identifying that a difference value between a first sequence number and a second sequence number is equal to or less than a preconfigured value (720—NO), a communication processor 192 may re-perform operation 710.

According to various embodiments of the disclosure, in response to a case of identifying that a difference value between a first sequence number and a second sequence number is equal to or greater than (or exceeds) a preconfigured value (720—YES), in operation 730, a communication processor 192 may transmit a CQI indicating that the quality of a channel is low to a node having a relatively low data transmission speed among a master node 410 or a secondary node 420.

According to various embodiments of the disclosure, in response to a case of identifying that a difference between a first sequence number and a second sequence number is equal to or greater than (or exceeds) a preconfigured value, a communication processor 192 may transmit a channel quality indicator (CQI) indicating that the quality of a channel corresponding to a bearer having a relatively low data transmission speed is low to a node having a relatively low transmission speed among a master node 410 or a secondary node 420. A PDCP included in a node which has received a CQI may decrease the number of pieces of data transmitted through a bearer having a relatively low data transmission speed. By transmitting a channel quality indicator indicating that the quality of a channel corresponding to a bearer having a relatively low data transmission speed is low, a communication processor 192 may induce a decrease in data transmission using a bearer having a relatively low data transmission speed.

According to various embodiments of the disclosure, in response to a case of identifying that a difference between a first sequence number and a second sequence number is equal to or greater than (or exceeds) a preconfigured value, a communication processor 192 may transmit, to a node having a relatively low data transmission speed among a master node 410 or a secondary node 420, a channel quality indicator (CQI) indicating that it is impossible to receive data by using a bearer having a relatively low data transmission speed. A PHY entity corresponding to a bearer having a relatively low data transmission speed and included in a PHY layer (for example: a PHY layer 600 of FIG. 6) may configure a CQI value corresponding to a channel of a bearer having a relatively low data transmission speed to 0, and may transmit, to a node having a relatively low data transmission speed among a master node 410 or a secondary node 420, a channel quality indicator indicating that data reception is impossible. By configuring a channel quality indicator to 0, a communication processor 192 may notify, to a node having a relatively low data transmission speed among a master node 410 or a secondary node 420, that data reception is impossible.

According to various embodiments of the disclosure, a PDCP of a master node 410 or a secondary node 420 which has received a channel quality indicator indicating that the quality of a channel is low may decrease the number of pieces of data transmitted through a bearer having a relatively low data transmission speed or may stop data transmission. An electronic device 101 may induce a decrease in or a stop of data transmission using a bearer having a relatively low data transmission speed via a scheme as described above.

Figure 8:
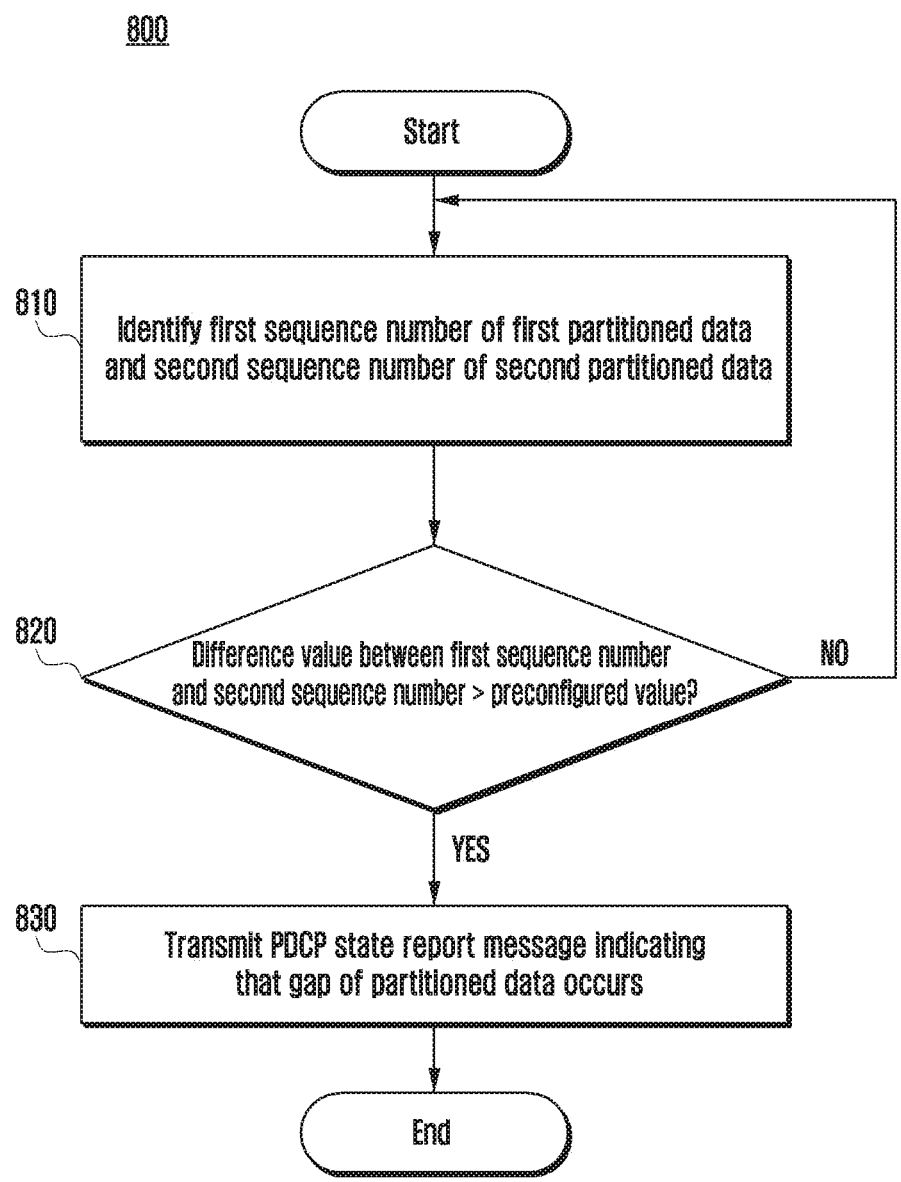
FIG. 8 is a view illustrating an electronic device, where a packet data convergence protocol (PDCP) state report is transmitted according to an embodiment of the disclosure.

FIG. 8 is a view illustrating an embodiment in which, in an electronic device, a PDCP state report is transmitted according to an embodiment of the disclosure.

A communication processor (for example: a communication processor 192 of FIG. 6) of an electronic device (for example: an electronic device 101 of FIG. 1) according to various embodiments may receive first partitioned data from a master node (for example: a master node 410 of FIG. 4A), and may receive second partitioned data from a secondary node (for example: a secondary node 420 of FIG. 4A). First partitioned data and second partitioned data may mean partitioned data included in a plurality of pieces of partitioned data produced by partitioning one piece of data by a master node 410 or a secondary node 420.

Referring to FIG. 8, according to various embodiments of the disclosure, in operation 810 of flowchart 800, a communication processor 192 may identify a first sequence number of first partitioned data and a second sequence number of second partitioned data.

According to various embodiments of the disclosure, in operation 820, a communication processor 192 may identify whether or not a difference value between a first sequence number and a second sequence number is equal to or greater than (or exceeds) a preconfigured value.

According to various embodiments of the disclosure, in case that a difference between a first sequence number and a second sequence number is equal to or greater than a preconfigured value, it may be defined that a gap for reception of partitioned data has occurred. In case that a gap for reception of partitioned data occurs, a PDCP entity 631 may suspend processing of partitioned data until partitioned data having a sequence number between first partitioned data and second partitioned data is received. A stop of processing of partitioned data may cause a decrease in a data processing speed.

According to various embodiments of the disclosure, in response to a case of identifying that a difference value between a first sequence number and a second sequence number is equal to or less than a preconfigured value (820—NO), a communication processor 192 may re-perform operation 810.

According to various embodiments of the disclosure, in response to a case of identifying that a difference value between a first sequence number and a second sequence number is equal to or greater than (or exceeds) a preconfigured value (820—YES), in operation 830, a communication processor 192 may transmit, to a node having a relatively low data transmission speed among a master node 410 or a secondary node 420, a PDCP state report message indicating that a gap of partitioned data occurs. According to various embodiments of the disclosure, a communication processor 192 may transmit a PDCP state report message to a core network 430 via an NAS protocol included in a control plane protocol.

According to various embodiments of the disclosure of the disclosure, a PDCP state report message may include a type (PDU TYPE) of a message indicating a gap occurrence detection state report message, an indicator (G) indicating whether or not a gap occurs, and an indicator (RAT) indicating cellular communication which transmits a low sequence number. For example, in response to a case of detecting occurrence of a gap, a PDCP entity 611 may produce a PDCP state report message including an indicator (G) including a value (1) indicating occurrence of a gap and an indicator RAT including a value (for example: 1 for first cellular communication and 0 for second cellular communication) indicating particular cellular communication, and may transmit the produced state report message to a master node 410 or a secondary node 420.

According to various embodiments of the disclosure, a PDCP state report message may include a type (PDU TYPE) of a message indicating a gap occurrence detection state report message, an indicator (G) indicating whether or not a gap occurs, and an indicator (N) indicating a node which transmits a low sequence number. For example, in response to a case of detecting occurrence of a gap, a PDCP entity 611 may produce a PDCP state report message including an indicator (G) including a value (1) indicating occurrence of a gap and an indicator (N) including a value (for example: 0 for a master node and 1 for a secondary node) indicating a particular node, and may transmit the produced state report message to a master node 410 or a secondary node 420.

According to various embodiments of the disclosure, a master node 410 or a secondary node 420 which has received a PDCP state report message indicating that a gap in reception of partitioned data has occurred may decrease the number of pieces of data transmitted through a bearer having a relatively low data transmission speed. Via a scheme as described above, an electronic device 101 may induce a decrease in or a stop of data transmission using a bearer having a relatively low data transmission speed.

Figure 9:
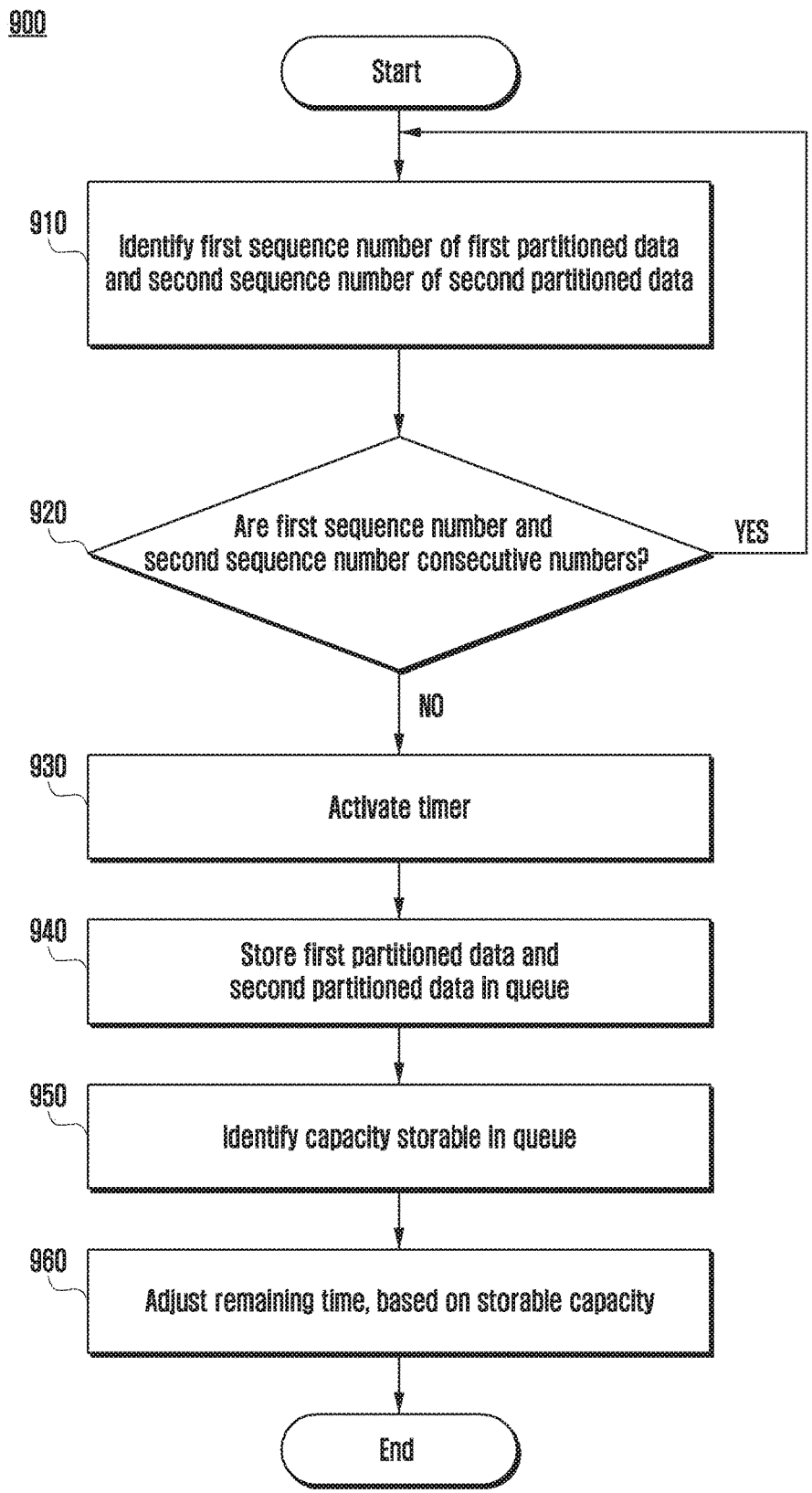
FIG. 9 is a view illustrating an electronic device, where a time configured for a timer is adjusted based on a capacity storable in a queue which stores first partitioned data and second partitioned data according to an embodiment of the disclosure.

FIG. 9 is a view illustrating an embodiment in which, in an electronic device, a time configured for a timer is adjusted based on a capacity storable in a queue which stores first partitioned data and second partitioned data according to an embodiment of the disclosure.

A communication processor (for example: a communication processor 192 of FIG. 6) of an electronic device (for example: an electronic device 101 of FIG. 1) according to various embodiments may receive first partitioned data from a master node (for example: a master node 410 of FIG. 4A), and may receive second partitioned data from a secondary node (for example: a secondary node 420 of FIG. 4A). First partitioned data and second partitioned data may be included in a plurality of pieces of partitioned data produced by partitioning one piece of data by a master node 410 or a secondary node 420.

Referring to FIG. 9, according to various embodiments of the disclosure, in operation 910 of flowchart 900, a communication processor 192 may identify a first sequence number of first partitioned data and a second sequence number of second partitioned data.

According to various embodiments of the disclosure, in operation 920, a communication processor 192 may identify whether or not a first sequence number and a second sequence number are consecutive.

According to various embodiments of the disclosure, in response to a case of identifying that a first sequence number and a second sequence number are not consecutive (920—NO), a communication processor 192 may activate a timer in operation 930. In response to a case of identifying that a first sequence number and a second sequence number are consecutive (920—YES), a communication processor 192 may not activate a timer and may identify a first sequence number of first partitioned data and a second sequence number of second partitioned data (operation 910).

According to various embodiments of the disclosure, in operation 940, a communication processor 192 may store first partitioned data and second partitioned data in a queue (for example: a queue 633 of FIG. 6) in a state where a timer is active.

According to various embodiments of the disclosure, a communication processor 192 may be on standby to receive another piece of partitioned data between first partitioned data and second partitioned data while a time configured using a timer elapses. A communication processor 192 may identify whether or not a sequence number has received partitioned data having consecutive sequence numbers while a preconfigured time elapses in a state where first partitioned data and second partitioned data are stored in a queue 633. A communication processor 192 may suspend processing of partitioned data until partitioned data having a sequence number between a first sequence number and a second sequence number is received.

According to various embodiments of the disclosure, in operation 950, a communication processor 192 may identify a capacity storable in a queue 633 in a state where reception of partitioned data between first partitioned data and second partitioned data is on standby.

According to various embodiments of the disclosure, a capacity storable in a queue 633 may mean a capacity excluding a capacity occupied by partitioned data including first partitioned data and second partitioned data from the total capacity of the queue 633. In response to a case of identifying that, for example, half a time configured in a timer elapses, a communication processor 192 may identify a capacity storable in a queue 633. At this time, a remaining time may be half a preconfigured time.

According to various embodiments of the disclosure, in operation 960, based on a capacity storable in a queue 633, a communication processor 192 may adjust a remaining time.

According to various embodiments of the disclosure, based on a capacity storable in a queue 633, a communication processor 192 may determine the degree of decrease of a preconfigured time. The less a capacity storable in a queue 633 is, the more a communication processor 192 may increase the degree of decrease of a remaining time.

According to various embodiments of the disclosure, in response to a case of identifying that the level of a capacity storable in a queue 633 is less than a preconfigured value, a communication processor 192 may decrease a remaining time. A preconfigured value may be a value related to a transmission speed of first cellular communication or second cellular communication. A case in which the level of a capacity storable in a queue 633 is less than a preconfigured value may mean a state in which the number of pieces of partitioned data transmitted to a communication processor 192 is relatively large. In the state, quality related to a transmission speed of first cellular communication or second cellular communication may be good. In the state, a partitioned data reception speed may increase in a scheme in which a communication processor 192 re-receives partitioned data from a master node 410 or a secondary node 420 than in a scheme in which reception of partitioned data from a master node 410 or a secondary node 420 is on standby while a preconfigured time elapses.

According to various embodiments of the disclosure, the more a capacity storable in a queue 633 decreases, the more a communication processor 192 may increase the degree of decrease of a preconfigured time, and thus a timer may be allowed to expire rapidly. In response to expiration of a timer, a communication processor 192 may request, to a master node 410 or a secondary node 420, retransmission of partitioned data. Via a scheme as described above, a communication processor 192 may prevent reception of data having sequence numbers which are not consecutive.

An electronic device according to various embodiments may include: at least one communication processor which receives data via a first cellular communication or a second cellular communication; and an application processor, wherein the at least one communication processor is configured to: receive, from a master node corresponding to the first cellular communication, first partitioned data among partitioned data produced by partitioning the data, and receive second partitioned data from a secondary node corresponding to the second cellular communication; identify a first sequence number of the first partitioned data and a second sequence number of the second partitioned data; and based on comparison of a preconfigured value with a difference value between the first sequence number and the second sequence number, induce a decrease in or a stop of transmission of pieces of partitioned data to the electronic device via a node which transmits partitioned data corresponding to a small sequence number among the first sequence number and the second sequence number.

In the electronic device according to various embodiments of the disclosure, the at least one communication processor may be configured to, in response to a case of identifying that the difference value between the first sequence number and the second sequence number is equal to or greater than the preconfigured value, transmit, to a node corresponding to at least one cellular communication among the first cellular communication or the second cellular communication, a channel quality indicator (CQI) indicating that the quality of a channel is low.

In the electronic device according to various embodiments of the disclosure, the at least one communication processor may be configured to, in response to a case of identifying that the difference value between the first sequence number and the second sequence number is equal to or greater than the preconfigured value, transmit, to a node corresponding to at least one cellular communication among the first cellular communication or the second cellular communication, a channel quality indicator (CQI) indicating that data reception is impossible.

In the electronic device according to various embodiments of the disclosure, the at least one communication processor may be configured to transmit, to the master node, a PDCP state report indicating whether or not the difference value between the first sequence number and the second sequence number is equal to or greater than the preconfigured value.

In the electronic device according to various embodiments of the disclosure, the at least one communication processor may be configured to: in response to a case of identifying that a preconfigured time expires, identify whether or not the difference value between the first sequence number and the second sequence number is equal to or greater than the preconfigured value; and based on a result of the identification, determine whether or not to maintain performing an operation of inducing a decrease in or a stop of transmission of pieces of partitioned data to the electronic device via a node corresponding to one cellular communication among the first cellular communication or the second cellular communication.

In the electronic device according to various embodiments of the disclosure, the preconfigured time may be configured to increase according to the number of times in which whether or not the difference value between the first sequence number and the second sequence number is equal to or greater than the preconfigured value.

In the electronic device according to various embodiments of the disclosure, the at least one communication processor may be configured to: in response to a case of identifying that the first sequence number and the second sequence number are not consecutive, activate a timer which identifies whether or not a preconfigured time expires; temporarily store the first partitioned data and the second partitioned data in a queue; in response to a case of identifying that the preconfigured time expires, identify a capacity storable in the queue; and based on a result of identifying the capacity storable in the queue, adjust the preconfigured time.

In the electronic device according to various embodiments of the disclosure, the at least one communication processor may be configured to decrease the preconfigured time in response to a case of identifying that the capacity storable in the queue is equal to or less than a preconfigured value.

In the electronic device according to various embodiments of the disclosure, the at least one communication processor may be configured to, based on the capacity storable in the queue, determine a decreased value of the preconfigured time.

An electronic device according to various embodiments may include: at least one communication processor which receives data via a first cellular communication or a second cellular communication; and an application processor, wherein the at least one communication processor is configured to: receive, from a master node corresponding to the first cellular communication, first partitioned data among partitioned data produced by partitioning the data, and receive second partitioned data from a secondary node corresponding to the second cellular communication; identify a first sequence number of the first partitioned data and a second sequence number of the second partitioned data; in response to a case of identifying that the first sequence number and the second sequence number are not consecutive, activate a timer which identifies whether or not a preconfigured time elapses; temporarily store the first partitioned data and the second partitioned data in a queue; in response to a case of identifying that the preconfigured time expires, identify a capacity storable in the queue; and based on a result of identifying the capacity storable in the queue, adjust the preconfigured time.

In the electronic device according to various embodiments of the disclosure, the at least one communication processor may be configured to decrease the preconfigured time in response to a case of identifying that the capacity storable in the queue is equal to or greater than a preconfigured value.

In the electronic device according to various embodiments of the disclosure, the at least one communication processor may be configured to increase the preconfigured time in response to a case of identifying that the capacity storable in the queue is equal to or less than a preconfigured value.

In the electronic device according to various embodiments of the disclosure, the at least one communication processor may be configured to identify the capacity storable in the queue in response to a case of identifying that half the preconfigured time elapses after the timer is activated.

In the electronic device according to various embodiments of the disclosure, the at least one communication processor may be configured to adjust a maximum capacity of the queue, based on a data processing speed.

Figure 10:
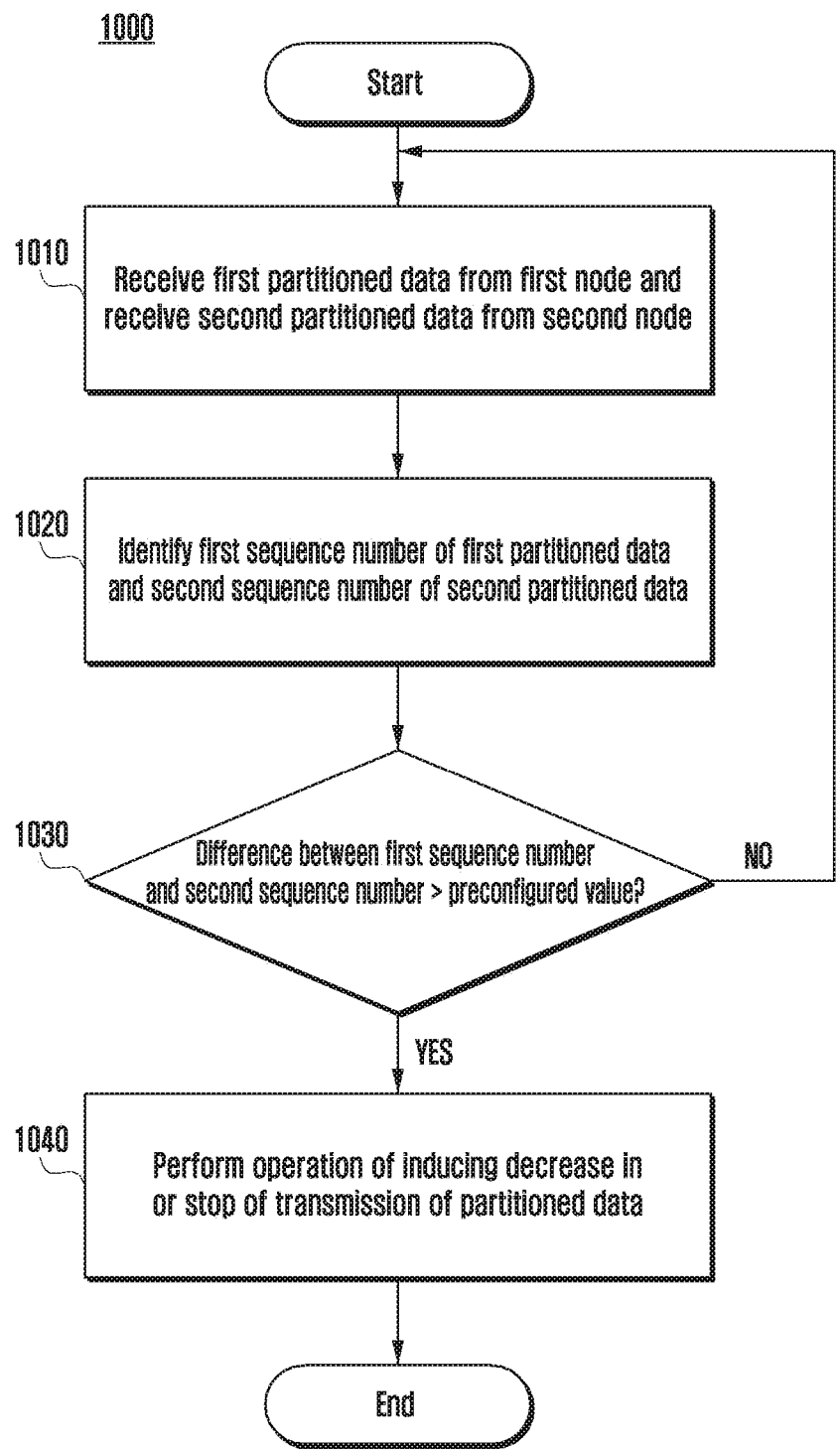
FIG. 10 is a flowchart illustrating a method of an electronic device according to an embodiment of the disclosure.

FIG. 10 is a flowchart illustrating a method of an electronic device according to an embodiment of the disclosure.

Referring to FIG. 10, according to various embodiments of the disclosure, in operation 1010 of flowchart 1000, a communication processor (for example: a communication processor 192 of FIG. 6) of an electronic device (for example: an electronic device 101 of FIG. 1) may receive first partitioned data from a master node (for example: a master node 410 of FIG. 4A), and may receive second partitioned data from a secondary node (for example: a secondary node 420 of FIG. 4A).

First partitioned data and second partitioned data may mean partitioned data included in a plurality of pieces of partitioned data produced by partitioning one piece of data by a master node 410 or a secondary node 420.

According to various embodiments of the disclosure, in operation 1020, a communication processor 192 may identify a first sequence number of first partitioned data and a second sequence number of second partitioned data.

According to various embodiments of the disclosure, in operation 1030, a communication processor 192 may identify whether or not a difference value between a first sequence number and a second sequence number is equal to or greater than (or exceeds) a preconfigured value.

According to various embodiments of the disclosure, in case that a difference between a first sequence number and a second sequence number is equal to or greater than a preconfigured value, it may be defined that a gap for reception of partitioned data has occurred. In case that a gap for reception of partitioned data occurs, a communication processor 192 may suspend processing of partitioned data until partitioned data having a sequence number between first partitioned data and second partitioned data is received. A stop of processing of partitioned data may cause a decrease in a data processing speed.

According to various embodiments of the disclosure, in response to a case of identifying that a difference value between a first sequence number and a second sequence number is equal to or less than a preconfigured value (1030—NO), a communication processor 192 may re-perform operation 1010.

According to various embodiments of the disclosure, in response to a case of identifying that a difference value between a first sequence number and a second sequence number is equal to or greater than (or exceeds) a preconfigured value (1030—YES), in operation 1040, a communication processor 192 may perform an operation of inducing a decrease in or a stop of transmission of partitioned data using a bearer having a relatively low data transmission speed.

According to various embodiments of the disclosure, in response to a case of identifying that a difference between a first sequence number and a second sequence number is equal to or greater than (or exceeds) a preconfigured value, a communication processor 192 may transmit a channel quality indicator (CQI) indicating that the quality of a channel corresponding to a bearer having a relatively low data transmission speed is low to a node having a relatively low transmission speed among a master node 410 or a secondary node 420. A PDCP of a mater node 410 or a secondary node 420 may decrease the number of pieces of data transmitted through a bearer having a relatively low data transmission speed. By transmitting a channel quality indicator indicating that the quality of a channel corresponding to a bearer having a relatively low data transmission speed is low, a communication processor 192 may induce a decrease in data transmission using a bearer having a relatively low data transmission speed.

According to various embodiments of the disclosure, in response to a case of identifying that a difference between a first sequence number and a second sequence number is equal to or greater than (or exceeds) a preconfigured value, a communication processor 192 may transmit, to a node having a relatively low data transmission speed among a master node 410 or a secondary node 420, a channel quality indicator (CQI) indicating that it is impossible to receive data by using a bearer having a relatively low data transmission speed. A communication processor 192 may configure a CQI value corresponding to a channel of a bearer having a relatively low data transmission speed to 0, and may transmit, to a mater node 410 or a secondary node 420, a channel quality indicator indicating that data reception is impossible. By configuring a channel quality indicator to 0, a communication processor 192 may notify, to a mater node 410 or a secondary node 420, that data reception is impossible.

According to various embodiments of the disclosure, a core network 430 connected to a master node 410 which has received a channel quality indicator indicating that the quality of a channel is low may decrease the number of pieces of data transmitted through a bearer having a relatively low data transmission speed, or may stop data transmission. An electronic device 101 may induce a decrease in or a stop of data transmission using a bearer having a relatively low data transmission speed via a scheme as described above.

According to various embodiments of the disclosure, in response to a case of identifying that a difference value between a first sequence number and a second sequence number is equal to or greater than (or exceeds) a preconfigured value, a communication processor 192 may transmit, to a master node 410, a PDCP state report message indicating that a gap of partitioned data occurs.

According to various embodiments of the disclosure, a master node 410 which has received a PDCP state report message indicating that a gap in reception of partitioned data has occurred may decrease the number of pieces of data transmitted through a bearer having a relatively low data transmission speed. Via a scheme as described above, a communication processor 192 may induce a decrease in or a stop of data transmission using a bearer having a relatively low data transmission speed.

A method of an electronic device according to various embodiments may include: by a communication processor, receiving, from a master node which performs first cellular communication with the electronic device, first partitioned data among partitioned data produced by partitioning data, and receiving second partitioned data from a secondary node which performs second cellular communication with the electronic device; identifying, by a packet data convergence protocol (PDCP) implemented on the communication processor, a first sequence number of the first partitioned data and a second sequence number of the second partitioned data; and based on comparison of a preconfigured value with a difference value between the first sequence number and the second sequence number, inducing, by the PDCP, a decrease in or a stop of transmission of pieces of partitioned data to the electronic device via a node which transmits partitioned data corresponding to a rapid sequence number among the first sequence number and the second sequence number.

In the method of the electronic device according to various embodiments of the disclosure, the inducing of the decrease in or the stop of transmission of the pieces of partitioned data may include, in response to a case of identifying that the difference value between the first sequence number and the second sequence number is equal to or greater than the preconfigured value, transmitting, to a node corresponding to at least one cellular communication among the first cellular communication or the second cellular communication, a channel quality indicator (CQI) indicating that the quality of a channel is degraded.

In the method of the electronic device according to various embodiments of the disclosure, the inducing of the decrease in or the stop of transmission of the pieces of partitioned data may include, in response to a case of identifying that the difference value between the first sequence number and the second sequence number is equal to or greater than the preconfigured value, transmitting, to a node corresponding to at least one cellular communication among the first cellular communication or the second cellular communication, a channel quality indicator (CQI) indicating that data reception is impossible.

In the method of the electronic device according to various embodiments of the disclosure, the inducing of the decrease in or the stop of transmission of the pieces of partitioned data may include transmitting, to a node corresponding to one cellular communication among the first cellular communication or the second cellular communication, a PDCP state report indicating whether or not the difference value between the first sequence number and the second sequence number is equal to or greater than the preconfigured value.

The method of the electronic device according to various embodiments may further include: in response to a case of identifying that the first sequence number and the second sequence number are not consecutive, activating a timer which identifies whether or not a preconfigured time expires; temporarily storing the first partitioned data and the second partitioned data in a queue; in response to a case of identifying that the preconfigured time expires, identifying a capacity storable in the queue; and based on a result of identifying the capacity storable in the queue, adjusting the preconfigured time.

In the method of the electronic device according to various embodiments of the disclosure, the adjusting of the preconfigured time may include decreasing the preconfigured time in response to a case of identifying that the capacity storable in the queue is equal to or less than a preconfigured value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one communication processor which receives data via a first cellular communication or a second cellular communication; and
   an application processor,
   wherein the at least one communication processor is configured to:
      receive, from a master node corresponding to the first cellular communication, first partitioned data among partitioned data produced by partitioning the data, and receive second partitioned data from a secondary node corresponding to the second cellular communication;
      identify a first sequence number of the first partitioned data and a second sequence number of the second partitioned data; and
      based on comparison of a preconfigured value with a difference value between the first sequence number and the second sequence number, induce a decrease in or a stop of transmission of pieces of partitioned data to the electronic device via a node which transmits partitioned data corresponding to a small sequence number among the first sequence number and the second sequence number.

2. The electronic device of claim 1, wherein the at least one communication processor is further configured to, in response to a case of identifying that the difference value between the first sequence number and the second sequence number is equal to or greater than the preconfigured value, transmit, to a node corresponding to at least one cellular communication among the first cellular communication or the second cellular communication, a channel quality indicator (CQI) indicating that the quality of a channel is low.

3. The electronic device of claim 1, wherein the at least one communication processor is further configured to, in response to a case of identifying that the difference value between the first sequence number and the second sequence number is equal to or greater than the preconfigured value, transmit, to a node corresponding to at least one cellular communication among the first cellular communication or the second cellular communication, a channel quality indicator (CQI) indicating that data reception is impossible.

4. The electronic device of claim 1, wherein the at least one communication processor is further configured to transmit, to the master node, a PDCP state report indicating whether or not the difference value between the first sequence number and the second sequence number is equal to or greater than the preconfigured value.

5. The electronic device of claim 1, wherein the at least one communication processor is further configured to:
   in response to a case of identifying that a preconfigured time expires, identify whether or not the difference value between the first sequence number and the second sequence number is equal to or greater than the preconfigured value; and
   based on a result of the identification, determine whether or not to maintain performing an operation of inducing a decrease in or a stop of transmission of pieces of partitioned data to the electronic device via a node corresponding to one cellular communication among the first cellular communication or the second cellular communication.

6. The electronic device of claim 5, wherein the preconfigured time is configured to increase according to the number of times in which whether or not the difference value between the first sequence number and the second sequence number is equal to or greater than the preconfigured value.

7. The electronic device of claim 1, wherein the at least one communication processor is further configured to:
   in response to a case of identifying that the first sequence number and the second sequence number are not consecutive, activate a timer which identifies whether or not a preconfigured time expires;
   temporarily store the first partitioned data and the second partitioned data in a queue;
   in response to a case of identifying that the preconfigured time expires, identify a capacity storable in the queue; and
   based on a result of identifying the capacity storable in the queue, adjust the preconfigured time.

8. The electronic device of claim 7, wherein the at least one communication processor is further configured to decrease the preconfigured time in response to a case of identifying that the capacity storable in the queue is equal to or less than a preconfigured value.

9. The electronic device of claim 8, wherein the at least one communication processor is further configured to, based on the capacity storable in the queue, determine a decreased value of the preconfigured time.

10. An electronic device comprising:
   at least one communication processor which receives data via a first cellular communication or a second cellular communication; and
   an application processor,
   wherein the at least one communication processor is configured to:
      receive, from a master node corresponding to the first cellular communication, first partitioned data among partitioned data produced by partitioning the data, and receive second partitioned data from a secondary node corresponding to the second cellular communication,
      identify a first sequence number of the first partitioned data and a second sequence number of the second partitioned data,
      in response to a case of identifying that the first sequence number and the second sequence number are not consecutive, activate a timer which identifies whether or not a preconfigured time elapses,
      temporarily store the first partitioned data and the second partitioned data in a queue,
      in response to a case of identifying that the preconfigured time expires, identify a capacity storable in the queue, and
      based on a result of identifying the capacity storable in the queue, adjust the preconfigured time.

11. The electronic device of claim 10, wherein the at least one communication processor is further configured to decrease the preconfigured time in response to a case of identifying that the capacity storable in the queue is equal to or greater than a preconfigured value.

12. The electronic device of claim 10, wherein the at least one communication processor is further configured to increase the preconfigured time in response to a case of identifying that the capacity storable in the queue is equal to or less than a preconfigured value.

13. The electronic device of claim 10, wherein the at least one communication processor is further configured to identify the capacity storable in the queue in response to a case of identifying that half the preconfigured time elapses after the timer is activated.

14. The electronic device of claim 10, wherein the at least one communication processor is further configured to adjust a maximum capacity of the queue, based on a data processing speed.

15. A method of an electronic device, the method comprising:
receiving, by a communication processor, from a master node which performs first cellular communication with the electronic device, first partitioned data among partitioned data produced by partitioning data, and receiving second partitioned data from a secondary node which performs second cellular communication with the electronic device;
identifying, by a packet data convergence protocol (PDCP) implemented on the communication processor, a first sequence number of the first partitioned data and a second sequence number of the second partitioned data; and
based on comparison of a preconfigured value with a difference value between the first sequence number and the second sequence number, inducing, by the PDCP, a decrease in or a stop of transmission of pieces of partitioned data to the electronic device via a node which transmits partitioned data corresponding to a rapid sequence number among the first sequence number and the second sequence number.

16. The method of claim 15, wherein the inducing of the decrease in or the stop of transmission of the pieces of partitioned data comprises, in response to a case of identifying that the difference value between the first sequence number and the second sequence number is equal to or greater than the preconfigured value, transmitting, to a node corresponding to at least one cellular communication among the first cellular communication or the second cellular communication, a channel quality indicator (CQI) indicating that the quality of a channel is degraded.

17. The method of claim 15, wherein the inducing of the decrease in or the stop of transmission of the pieces of partitioned data comprises, in response to a case of identifying that the difference value between the first sequence number and the second sequence number is equal to or greater than the preconfigured value, transmitting, to a node corresponding to at least one cellular communication among the first cellular communication or the second cellular communication, a channel quality indicator (CQI) indicating that data reception is impossible.

18. The method of claim 15, wherein the inducing of the decrease in or the stop of transmission of the pieces of partitioned data comprises transmitting, to a node corresponding to one cellular communication among the first cellular communication or the second cellular communication, a PDCP state report indicating whether or not the difference value between the first sequence number and the second sequence number is equal to or greater than the preconfigured value.

19. The method of claim 15, further comprising:
in response to a case of identifying that the first sequence number and the second sequence number are not consecutive, activating a timer which identifies whether or not a preconfigured time expires;
temporarily storing the first partitioned data and the second partitioned data in a queue;
in response to a case of identifying that the preconfigured time expires, identifying a capacity storable in the queue; and
based on a result of identifying the capacity storable in the queue, adjusting the preconfigured time.

20. The method of claim 19, wherein the adjusting of the preconfigured time comprises decreasing the preconfigured time in response to a case of identifying that the capacity storable in the queue is equal to or less than a preconfigured value.

* * * * *